United States Patent
Hui et al.

(10) Patent No.: US 8,442,449 B2
(45) Date of Patent: May 14, 2013

(54) RECEIVER AND METHOD FOR REDUCING AN AMOUNT OF CHANNEL STATE INFORMATION FEEDBACK TO A TRANSMITTER

(75) Inventors: Dennis Hui, Cupertino, CA (US);
Jung-Fu Cheng, Fremont, CA (US);
Kambiz Zangi, Chapel Hill, NC (US);
Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 211 days.

(21) Appl. No.: 12/941,114

(22) Filed: Nov. 8, 2010

(65) Prior Publication Data
US 2012/0115427 A1 May 10, 2012

(51) Int. Cl.
*H04B 1/00* (2006.01)
*H04B 7/00* (2006.01)

(52) U.S. Cl.
USPC .......... 455/69; 455/226.1; 370/208; 370/210; 375/240; 375/260

(58) Field of Classification Search ........... 455/69, 455/226.1; 370/208, 210, 329; 375/240, 260, 375/267
See application file for complete search history.

(56) References Cited

U.S. PATENT DOCUMENTS

| | | | |
|---|---|---|---|
| 8,213,368 B2 * | 7/2012 | Hui et al. | 370/329 |
| 2005/0286650 A1 * | 12/2005 | Han et al. | 375/267 |
| 2009/0016425 A1 | 1/2009 | Hui et al. | |

OTHER PUBLICATIONS

Goldsmith. A. et al. Capacity of Fading Channels with Channel Side Information. *IEEE Trans. Info. Thy.* vol. 43, No. 6, pp. 1986-1992, Nov. 1997.
Teletar, E. Capacity of Multi-Antenna Gaussian Channels. *Euro. Trans. Telecomm. ETT*, vol. 10. No. 6, pp. 585-596, Nov. 1999.
Foschini, G. Layered Space-time Architecture for Wireless Communication in Fading Environments when Using Multi-element Antennas, *Bell Labs Tech. Journal.* pp. 41-50. 1996.
Schubert, M. et al. Solution of the Multiuser Downlink Beamforming Problem with Individual SINR Constraints. IEEE Transactions on Vehicular Technology, vol. 53, No. 1, pp. 18-28, Jan. 2004.
T.M. Cover and J.A. Thomas, Elements of Information Theory, John Wiley & Sons, 1991.
Osseiran A. et al.: "Capacity Evaluation of Fixed Beams in a WCDMA System using channel estimation based on P-CPICH", Communications, 2006. ICC '06. IEEE International Conference on, IEEE, PI, Jun. 1, 2006, pp. 4900-4905, XP031 025688, ISBN 978-1-4244-0354-7.

* cited by examiner

*Primary Examiner* — Tuan H Nguyen

(57) ABSTRACT

A receiver and a method are described herein for reducing an amount of channel state information related to a transmit channel correlation matrix $\Phi_{TX}$ that is feedback to a transmitter. In addition, to a transmitter and a method are described herein for reconstructing the transmit channel correlation matrix $\phi_{TX}$ using the reduced channel state feedback information received from the receiver.

44 Claims, 9 Drawing Sheets

RECEIVER AND METHOD FOR REDUCING AN AMOUNT OF CHANNEL STATE INFORMATION FEEDBACK TO A TRANSMITTER

TECHNICAL FIELD

The present invention relates to a receiver and a method for reducing an amount of channel state information related to a transmit channel correlation matrix $\phi_{TX}$ that is feedback to a transmitter. In addition, the present invention relates to a transmitter and a method for reconstructing the transmit channel correlation matrix $\phi_{TX}$ using the reduced channel state feedback information received from the receiver.

BACKGROUND

The following abbreviations are herewith defined, at least some of which are referred to within the following description of the prior art and the present invention.

| | |
|---|---|
| CQI | Channel Quality Indicators |
| DL | Downlink |
| FDD | Frequency Division Multiplexing |
| MIMO | Multiple Input Multiple Output |
| OFDM | Orthogonal Frequency Division Multiplexing |
| IID | Independent and Identically Distributed |
| FFT | Fast Fourier Transform |
| IFFT | Inverse Fast Fourier Transform |
| UE | User Equipment |
| UL | Uplink |

The use of multiple antennas at the transmitter and/or the receiver in wireless communication systems has attracted substantial attention over the past decade because of the potential improvement in both coverage and data rate. Unlike single antenna systems where exploiting the channel knowledge at the transmitter does not significantly improve the capacity, the pioneering works of Telatar and Foschini have shown that substantial gain in the capacity can be achieved with multiple antennas when accurate channel state information is available at the transmitter (see reference nos. 1-3). In a frequency-division multiplexing (FDD) system, the provision of such information at the transmitter relies mainly on the use of feedback. While assuming perfect channel state information at the transmitter is unrealistic due to the capacity limitation on the feedback link and its round-trip delay, it has been shown that even partial channel knowledge at the transmitter can provide significant gain when compared to systems without channel information at the transmitter. This has spurred significant interest in designing effective methods of reducing the amount of feedback of channel state information without significantly penalizing the capacity.

An effective approach to reducing the amount of feedback of channel state information without excessively sacrificing accuracy involves exploiting the statistics of the channel. For instance, in the co-assigned U.S. Patent Application No. 2009/0016425 A1, an effective method of compressing the feedback of the instantaneous channel response of a spatially correlated MIMO channel has been described (see reference no. 4). FIG. 1 (PRIOR ART) is a system diagram illustrating a transmitter 102 and a receiver 104 that communicate with one another using a MIMO channel 106 and implement this feedback method which utilizes fast and slow feedback links 108 and 110. The basic idea of this feedback method is to use the knowledge of certain second-order channel statistics at the receiver 104 to compress the channel response information 112. Then, the compressed feedback of the instantaneous channel response 112 is fed back from the receiver 104 to the transmitter 102 using the fast feedback link 108. On the other hand, the channel statistics $\phi_{TX}$ 114 is provided from the receiver 104 to the transmitter 102 through the low-rate slow feedback link 110 which sends back information much less frequently when compared to the fast feedback link 108.

An important aspect of the feedback method described in U.S. Patent Application Ser. No. 2009/0016425 A1 is that the receiver 104 applies a two-dimensional linear transformation (across frequency and space) to the samples of the frequency-domain response $H_f[k]$ of the MIMO channel 106 (it is assumed that the receiver 104 is able to obtain accurate estimates of the $n_R \times n_T$ channel matrix $H_f[k]$ for each k th subcarrier). This transformation is used to transform $H_f[k]$ into a vector of transform coefficients X in order to achieve substantial compression benefits. At the receiver 104, the frequency-domain channel response $H_f[k]$ is first converted into a time-domain channel response $\{H_1[n]\}_{n=1}^N$ through an inverse fast Fourier Transform (IFFT) operation. According to the assumed maximum delay spread of the system, the time-domain response is then truncated to fewer number of taps within a window of time indices, denoted by $W \subset \{1, 2, \ldots, N\}$. Each tap of the resulting channel response $\{H_1[n]\}_{n \in W}$ is further transformed spatially to obtain a set of transformed vector channel taps $\{X[n]\}_{n \in W}$, which is then further reduced into a smaller number of parameters before they are quantized into bits and fed back on the fast feedback link 108 to the transmitter 102.

The spatial transformation is done according to $$X[n] = vec(H_1[n]U_T) \qquad (1)$$

for all $n \in W$, where $U_T$ denotes the matrix with eigenvectors of the channel correlation matrix $\phi_{TX}$ given by:

$$\Phi_{TX} \equiv E\left[\frac{1}{N}\sum_{k=1}^{N} H_f[k]^H H_f[k]\right]. \qquad (2)$$

At the transmitter 102, an inverse spatial transformation is applied to the transformed coefficients so as to obtain an reproduction of the frequency-domain channel response $H_f[k]$. It is clear, that the transmitter 102 to perform the inverse spatial transformation will need to use the transmit channel correlation matrix $\phi_{TX}$ and as a result the transmit channel correlation matrix $\phi_{TX}$ also needs to be fed back by the receiver 104 to the transmitter 102. The receiver 104 can use the low-rate, slow feedback link 110 to send the transmit channel correlation matrix $\phi_{TX}$ (to the transmitter 102. However, the amount of this feedback is in the order of $O(n_T^2)$ and can be rather large. Hence, there has been and is a need to reduce the amount of feedback related to the transmit channel correlation matrix $\phi_{TX}$, that has to be sent to the transmitter 102. This need and other needs are addressed by the present invention.

SUMMARY

A receiver, a transmitter, and methods have been described in the independent claims of the present application. Advantageous embodiments of the receiver, the transmitter, and the methods have been described in the dependent claims.

In one aspect, the present invention provides a method implemented by a receiver for feeding channel state information back to a transmitter. The method comprising the steps of: (a) receiving a downlink signal from the transmitter; (b) computing a transmit channel correlation matrix $\phi'_{TX}$ using the received downlink signal; (c) estimating at least an azimuth angle $\theta$ (and possibly an elevation angle $\phi$, a standard deviation $\sigma_\phi$, and a standard deviation $\sigma_\theta$) from the transmitter to the receiver using the transmit channel correlation matrix $\phi'_{TX}$; and (d) sending data related to at least the azimuth angle $\theta$ (and possibly an elevation angle $\phi$, a standard deviation $\sigma_\phi$, and a standard deviation $\sigma_\theta$) to the transmitter. The present invention has an advantage in that it reduces the overhead on the slow feedback channel between the receiver and the transmitter.

In another aspect, the present invention provides a receiver for feeding channel state information back to a transmitter. The receiver comprises a processor and a non-transitory memory that stores processor-executable instructions wherein the processor interfaces with the non-transitory memory and executes the processor-executable instructions to: (a) receive a downlink signal from the transmitter; (b) compute a transmit channel correlation matrix $\phi'_{TX}$ using the received downlink signal; (c) estimate at least an azimuth angle $\theta$ (and possibly an elevation angle $\phi$, a standard deviation $\sigma_\phi$, and a standard deviation $\sigma_\theta$) from the transmitter to the receiver using the transmit channel correlation matrix $\phi'_{TX}$; and (d) send data related to at least the azimuth angle $\theta$ (and possibly an elevation angle $\phi$, a standard deviation $\sigma_\phi$, and a standard deviation $\sigma_\theta$) to the transmitter. The present invention has an advantage in that it reduces the overhead on the slow feedback channel between the receiver and the transmitter.

In yet another aspect, the present invention provides a method implemented by a transmitter for reconstructing a transmit channel correlation matrix $\phi_{TX}$ using at least feedback data received from a receiver. The method comprising the steps of: (a) receiving feedback data related to channel state information from the receiver; (b) converting the feedback data to at least an estimated azimuth angle $\theta$ (and possibly an estimated elevation angle $\phi$, an estimated standard deviation $\sigma_\phi$, and an estimated standard deviation $\sigma_\theta$); and (c) computing the transmit channel correlation matrix $\phi_{TX}$ using at least the estimated azimuth angle $\theta$ (and possibly the estimated elevation angle $\phi$, the estimated standard deviation $\sigma_\phi$, and the estimated standard deviation $\sigma_\theta$). The present invention has an advantage in that it reduces the overhead on the slow feedback channel between the receiver and the transmitter.

In yet another aspect, the present invention provides a transmitter for reconstructing a transmit channel correlation matrix $\phi_{TX}$ using at least feedback data received from a receiver. The transmitter comprises a processor and a non-transitory memory that stores processor-executable instructions wherein the processor interfaces with the non-transitory memory and executes the processor-executable instructions to: (a) receive feedback data related to channel state information from the receiver; (b) convert the feedback data to at least an estimated azimuth angle $\theta$ (and possibly an estimated elevation angle $\phi$, an estimated standard deviation $\sigma_\phi$, and an estimated standard deviation $\sigma_\theta$); and (c) compute the transmit channel correlation matrix $\phi_{TX}$ using at least the estimated azimuth angle $\theta$ (and possibly the estimated elevation angle $\phi$, the estimated standard deviation $\sigma_\phi$, and the estimated standard deviation $\sigma_\theta$). The present invention has an advantage in that it reduces the overhead on the slow feedback channel between the receiver and the transmitter.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
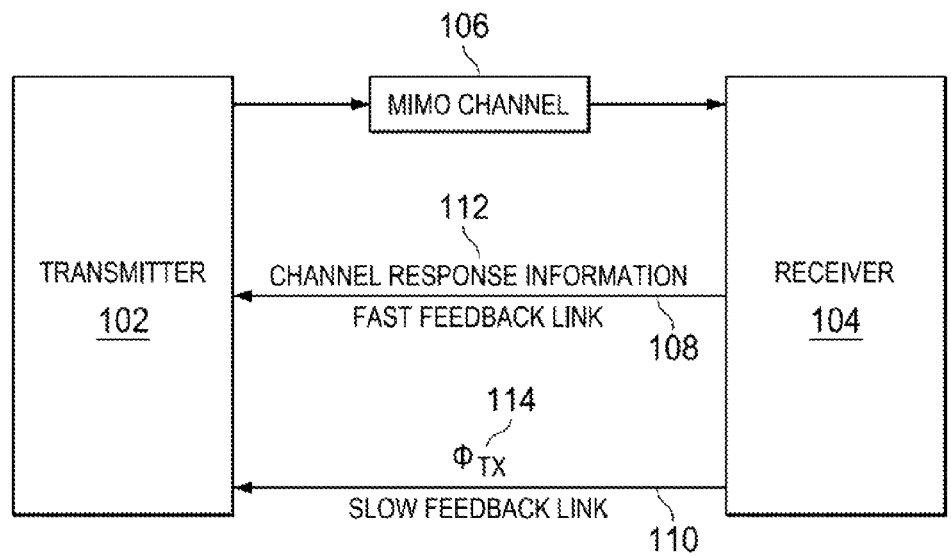
FIG. 1 (PRIOR ART) is a block diagram illustrating a receiver that transmits compressed channel response information (using a fast feedback link) and the channel correlation matrix $\phi_{TX}$ (using a slow feedback link) to a transmitter.
Figure 2:
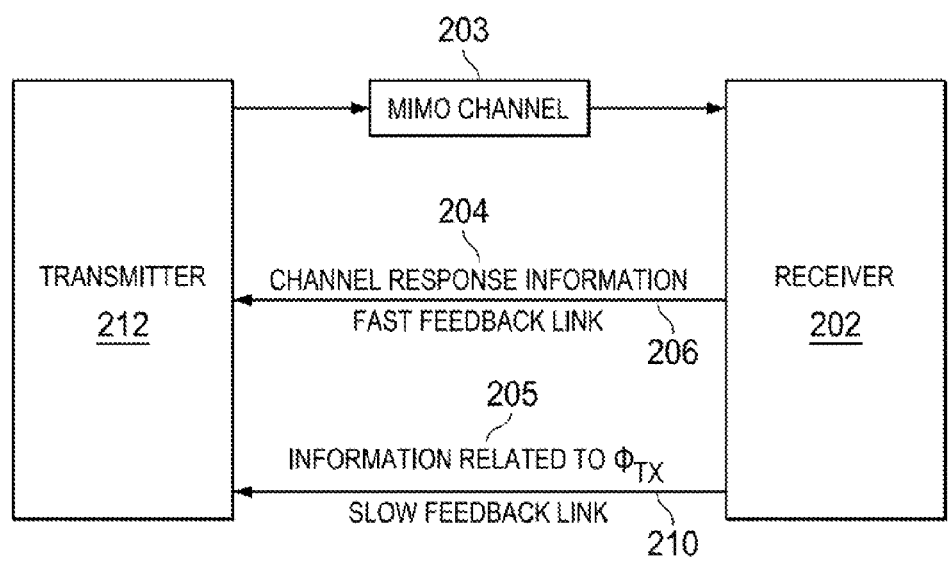
FIG. 2 is a block diagram illustrating a receiver that transmits compressed channel response information (using a fast feedback link) and information related to the channel correlation matrix $\phi_{TX}$ (using a slow feedback link) to a transmitter in accordance with the present invention.

Referring to FIG. 2, there is a block diagram illustrating a receiver 202 that receives information on a MIMO channel 203 and transmits compressed channel response information 204 (using a fast feedback link 206) and information 208 related to the channel correlation matrix $\phi_{TX}$ (using a slow feedback link 210) to a transmitter 212 in accordance with the present invention. As will be discussed in detail below, the present invention relates to the receiver 202 (e.g., mobile phone, UE) that reduces an amount of channel state information related to a transmit channel correlation matrix $\phi_{TX}$ that is feedback to the transmitter 212. In addition, the present invention relates to the transmitter 212 (e.g., base station) that can reconstruct the transmit channel correlation matrix $\phi_{TX}$ using the channel state feedback information 208 received from the receiver 202. One skilled in the art will readily appreciate that the exemplary receiver 202 and exemplary transmitter 212 shown and described herein omits many well known components which are not needed to explain the present invention but does show and describe the components which are needed to explain and enable the present invention.

Figure 3:
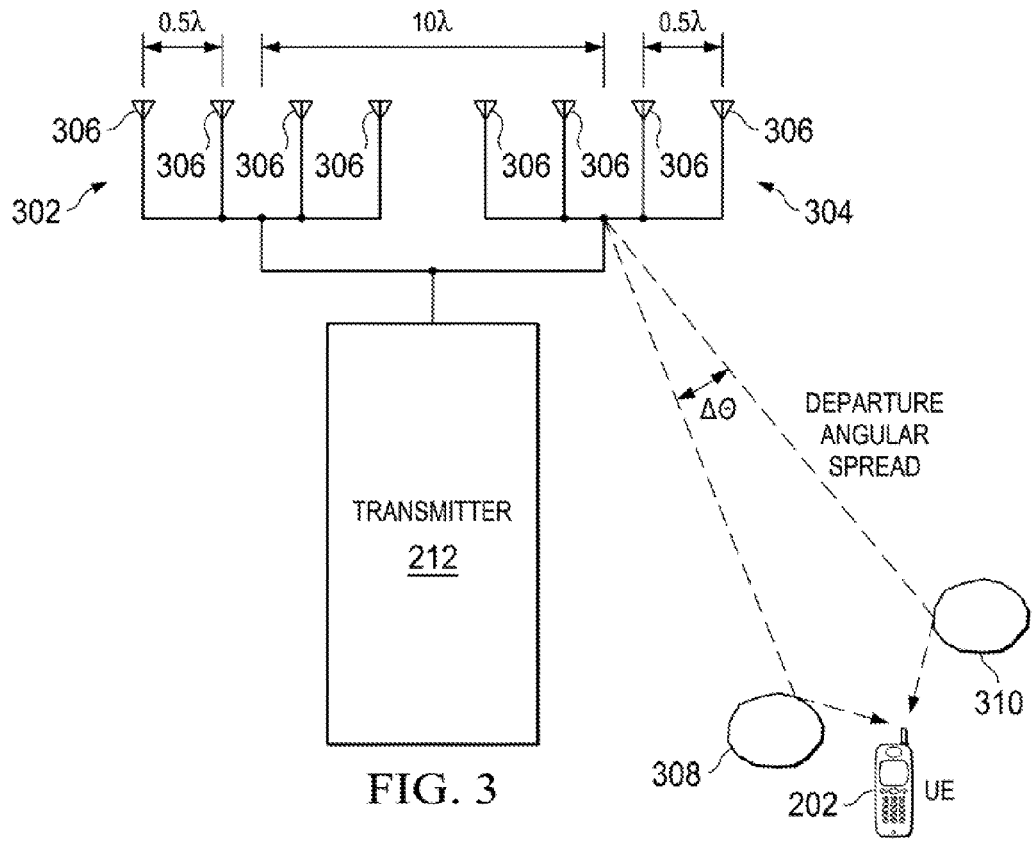
FIG. 3 is a block diagram of the transmitter shown in FIG. 2 having an exemplary clustered antenna configuration.

The receiver 202 can implement anyone of several effective methods which are described in detail below to reduce the amount of channel state information associated with a transmit channel correlation matrix $\phi_{TX}$ that is feedback over the slow feedback link 210 to the transmitter 212. The receiver 202 in implementing any of these effective methods has to effectively estimate the transmit channel covariance matrix $\phi_{TX}$ (see equation no. 2) and when doing this the transmitter 212 is assumed to have a closely spaced antenna configuration (e.g. with half-wavelength spacing). In the case, where the transmitter 212 has multiple clusters of closely spaced antennas, such as cross-polarized antennas, then the overall transmit covariance matrix $\phi_{TX}$ will have a block diagonal structure with the component transmit covariance matrices of individual antenna clusters as diagonal blocks, i.e.:

$$\Phi_{TX} = \begin{bmatrix} \Phi_{TX,1} & 0 & \Lambda & 0 \\ 0 & \Phi_{TX,2} & O & M \\ M & O & O & 0 \\ 0 & \Lambda & 0 & \Phi_{TX,N_c} \end{bmatrix} \quad (3)$$

where $\{\phi_{TX,n}\}_{n=1}^{N_c}$ denotes the transmit channel covariance matrix of each individual cluster of antenna elements, and $N_c$ denotes the number of antenna clusters. FIG. 3 shows the transmitter 212 which has an example of a clustered antenna configuration with two antenna clusters 302 and 304 that are physically separated by 10 wavelengths and each antenna cluster 302 and 304 has four closely spaced antennas 306 that have 0.5 wavelength spacing therebetween. In addition, FIG. 3 shows a departure angular spread $\Delta\theta$ associated with two scatters 308 and 310 and a receiver 202 (UE 202). The following discussion will focus on different methods the receiver 202 can implement for feeding information 208 related to the transmit channel covariance matrix $\phi_{TX,n}$ for each cluster n back to the transmitter 212. For notational simplicity, the subscript n will be omitted.

The main procedure is disclosed in the first embodiment. The first embodiment is applicable when the transmitter 212 has a transmit antenna with small spacing on the order of 0.5 wavelength separation and a departure angular spread on the order of 2 to 3 degrees or less. This type of transmitter 212 is commonly used in rural area with large cell sizes. For these cases, the channel correlation matrix $\phi_{TX}$ can be reproduced from a dominant eigenvector parameterized by an azimuth angle $\theta$ and a elevation angle $\phi$. Also, if the transmitter 212 has a transmit antenna configured to have an uniform linear antenna array then the channel correlation matrix $\phi_{TX}$ can be reproduced from a dominant eigenvector parameterized by only the azimuth angle $\theta$. Several methods for computing and processing these parameters at the receiver 202 and the transmitter 212 (network side) are disclosed in detail below.

The second embodiment extends the first embodiment to cases where the transmitter 212 has a transmit antenna with spacing on the order of 0.5-1 wavelength is separation and/or with a departure angular spread on the order of 4 to 10 degrees. For these cases, the channel correlation matrix $\phi_{TX}$ can be reproduced from a sum of a dominant eigenvector parameterized by an azimuth angle $\theta$ and a elevation angle $\phi$ and other small but non-negligible eigenvector(s) parameterized by a standard deviation $\sigma_\phi$ and a standard deviation $\sigma_\theta$. Also, if the transmitter 212 has a transmit antenna configured to have an uniform linear antenna array then the channel correlation matrix $\phi_{TX}$ can be reproduced from a dominant eigenvector parameterized by only the azimuth angle $\theta$ and the standard deviation $\sigma_\theta$. Several methods for computing and processing these parameters at the receiver 202 and the transmitter 212 (network side) are discussed below in order to produce the minimal required feedback parameters which characterize the combined effect of these eigenvectors.

The third embodiment is a refinement to the feedback procedures applicable to the first two embodiments. This embodiment cuts down the amount of feedback bits by recognizing the large-scale reciprocity of the UL and DL channels. More specifically, the procedures call for the transmitter 212 to combine its own large-scale measurements of the required parameters with fine-scale measurement feedback from the receiver 202 to arrive at the final measurements of the parameters used to reconstruct the transmit channel correlation matrix $\phi_{TX}$. Several methods for bit processing these parameters at the receiver 202 and the transmitter 212 (network side) are disclosed in detail below for efficient processing and feedback.

First Embodiment

The first embodiment is applicable when the transmitter 212 has a transmit antenna with small spacing on the order of 0.5 wavelength separation and a departure angular spread on the order of 2 to 3 degrees or less. Due to the small spacing between the antennas, the transmitter 212 has transmit antennas which are highly correlated. This implies that the channel correlation matrix $\phi_{TX}$ will have just one dominant eigenvector which is approximately equal to ($n_T\times1$) vector as follows:

$$v_T(\theta,\phi) \equiv \frac{1}{\sqrt{n_T}} \begin{bmatrix} 1 \\ \exp\left(-j\frac{2\pi}{\lambda}(r_2-r_1)^T a(\theta,\phi)\right) \\ M \\ \exp\left(-j\frac{2\pi}{\lambda}(r_{n_T}-r_1)^T a(\theta,\phi)\right) \end{bmatrix} \quad (4)$$

where $\lambda$ denotes the wavelength of the radio signal, $r_i$ is the spatial coordinates of the i-th transmit antenna, and a is a unit vector pointing from the center of the transmit antenna array at the transmitter 212 (e.g., base station 212) to the center of the receive antenna array at the receiver 202 (e.g., UE 202). The unit vector a can be expressed as $$a(\theta,\phi)=[\cos\theta\sin\phi, \sin\theta\sin\phi, \cos\theta]^T \quad (5)$$

where $\theta \in [0,\pi)$ and $\phi \in [0,\pi/2]$ denotes the azimuth and elevation angles, respectively, from the transmitter 212 to the receiver 202.

From the dominant eigenvector $v_T$, the transmit channel covariance matrix $\phi_{TX}$ can be approximated simply by $$\phi_{TX} \approx g \times v_T(\theta,\phi) v_T^H(\theta,\phi) \quad (6)$$

where g denotes a scalar gain factor. This approximation is valid for an environment with small transmit angular spread, e.g. in a typical macro cellular environment in the 3GPP standard. The gain factor $g = tr[\phi_{TX}]$ is not important for determining the desired spatial transformation $U_T$. However, the long-term gain factor g, which equals to the trace of the transmit channel covariance matrix $\phi_{TX}$, may or may not be needed at the transmitter 212 depending on applications. If necessary, the long-term gain factor g can also be quantized and fed back by the receiver 202. Alternatively, the long-term gain factor g may be measured by the transmitter 212 from uplink or be derived from channel quality indicators (CQI) averaged across frequency and time.

It is clear that with vector $v_T(\theta,\phi)$ defined by equation no. 4, only knowledge of the direction to the receiver 202 is necessary to calculate vector $v_T(\theta,\phi)$ at the transmitter 212. This information can be specified by the two real-valued bounded scalars (namely $\theta$ and $\phi$). Therefore, effective methods of quantizing and feeding back this angular information, as described herein, would allow the system to reduce the amount information on the slow feedback link 210 by a factor in the order of $O(n_T^2)$ compared to the direct feedback of the quantized elements of the transmit channel covariance matrix $\phi_{TX}$. A discussion is provided next to explain in detail how the receiver 202 can quantize and feedback this angular information to the transmitter 212 and how the transmitter 212 upon receiving, this angular information can reconstruct the transmit channel covariance matrix $\phi_{TX}$.

Procedure for the Receiver 202 (UE 202)

The basic idea behind the first embodiment where the transmitter 212 has closely spaced antennas with a small transmit angular spread is that the dominant eigenvector of the transmit channel covariance matrix $\phi_{TX}$, can be closely approximated by using equation nos. 4 and 5. Hence, the receiver 202 only needs to quantize and feedback the azimuth angle $\theta \in [0,\pi)$ and the elevation angle $\phi \in [0,\pi/2]$, which have compact support and are thus easier to be quantized, as described later.

If the transmitter 212 has a uniform linear antenna array, then the spatial coordinates $r_i$ can be written, without loss of generality, as:

$$r_i = \begin{bmatrix} (i - n_a/2)d \\ 0 \\ 0 \end{bmatrix} \quad (7)$$

where i=1, 2, L, $n_a$, and d denotes the antenna spacing and $n_a$ denotes the number of antennas (within the cluster), and equation no. 4 reduces to:

$$v_T(\theta,\phi) = \frac{1}{\sqrt{n_T}} \begin{bmatrix} 1 \\ \exp\left(-j\frac{2\pi d}{\lambda}\cos\theta\sin\phi\right) \\ M \\ \exp\left(-j\frac{2\pi d(n_T-1)}{\lambda}\cos\theta\sin\phi\right) \end{bmatrix} \quad (8)$$

$$= \frac{1}{\sqrt{n_T}} \begin{bmatrix} 1 \\ \exp\left(-j\frac{2\pi d}{\lambda}\cos\tilde{\theta}\right) \\ M \\ \exp\left(-j\frac{2\pi d(n_T-1)}{\lambda}\cos\tilde{\theta}\right) \end{bmatrix}$$

where $\theta^\% = \cos^{-1}(\cos\theta\sin\phi)$ is the equivalent azimuth angle $\theta$. In this case, only the azimuth angle $\theta^\%$ needs to be fed back by the receiver 202 for the transmitter 212 to have enough information be able to compute $v_T$ and hence the transmit channel covariance matrix $\phi_{TX}$.

If the transmitter 212 does not have the uniform linear antenna array then the receiver 202 can compute the azimuth and elevation angles, $\theta$ and $\phi$, based on averaging long-term measurements of transmit channel covariance matrix $\phi_{TX}$ by solving:

$$[\theta,\phi] = \underset{\theta',\phi'}{\mathrm{argmin}} \left\| \frac{\Phi'_{TX}}{tr\{\Phi'_{TX}\}} - v_T(\theta',\phi')v_T^H(\theta',\phi') \right\|_F^2 = \quad (9)$$

$$\underset{\theta',\phi'}{\mathrm{argmin}}\{v_T^H(\theta',\phi')\Phi'_{TX}v_T(\theta',\phi')\}$$

where $\phi'_{TX}$ denotes the measured value of transmit channel covariance matrix $\phi_{TX}$ at the receiver 202, and $\|g\|_F$ denotes the Frobenius norm of matrices. Alternatively, the receiver 202 may determine the azimuth angle $\theta$ and the elevation angle $\phi$ by first computing the most dominant eigenvector, denoted by $v'_1$, of $\phi'_{TX}$ and then solving:

$$[\theta,\phi] = \underset{\theta',\phi'}{\mathrm{argmin}} \|v'_1 - v_T(\theta',\phi')\|^2. \quad (10)$$

If the transmitter 212 has a uniform linear antenna array, then the receiver 202 can compute the equivalent azimuth angle $\theta$ by solving:

$$\theta^\% = \underset{\theta^\%}{\mathrm{argmin}} \left\| \frac{\Phi'_{TX}}{tr\{\Phi'_{TX}\}} - v_T^H(\theta^\%)v_T^H(\theta^\%) \right\|_F^2 \quad (11)$$

$$= \underset{\theta^\%}{\mathrm{argmax}}\{v_T^H(\theta^\%)\Phi'_{TX}v_T(\theta^\%)\}$$

or solving $$\theta^\% = \underset{\theta^\%}{\mathrm{argmin}}\|v'_1 - v_T(\theta^\%)\|^2. \quad (12)$$

Thus, an aspect of the present invention is an efficient method for enabling the receiver 202 to feed back the mean azimuth and elevation angles, $\theta$ and $\phi$, or just the azimuth angle $\theta$ to the transmitter 212. Since $\theta \in [0,\pi)$ and $\phi \in [0,\pi/2]$ have limited ranges, they can each be easily quantized by a uniform quantizer within the receiver 202. For example, suppose to $B_\theta$ and $B_\phi$ bits are allocated for feeding back the azimuth and elevation angles θ and φ, respectively, the receiver 202 can compute and feedback the following indices (perhaps in binary form):

$$I_\theta \equiv \left\lfloor 2^{B_\theta} \frac{\theta}{\pi} \right\rfloor + 1 \text{ and } I_\phi \equiv \left\lfloor 2^{B_\phi} \frac{\phi}{\pi/2} \right\rfloor + 1. \quad (13)$$

Alternatively, the receiver 202 may use a non-uniform quantizer which may designed according to the probability distribution of the azimuth and elevation angles θ and φ, which can then be used to generate the indices, $I_\theta$ and $I_\phi$ which are feedback to the transmitter 212. Then, the transmitter 212 can use a non-uniform quantizer to reconstruct the azimuth and elevation angles θ and φ.

If the receiver 202 allocates $B_\theta$ and $B_\phi$ bits for feeding back the azimuth and elevation angles θ and φ, then there are only $2^{H_\theta \cdot H_\phi}$ different possible combinations of reconstructed azimuth and elevation angles θ and φ. Hence, one method for solving equation nos. 9 and 10 is to exhaustively search over all the possible combinations. Alternatively, the receiver 202 can use numerical search techniques, such as steepest decent, to compute the azimuth and elevation angles θ and φ before quantization. In addition, the receiver 202 may also first perform a search over a coarser grid of reconstructed angles to find rough estimate of the azimuth and elevation angles θ and φ to followed by the use of numerical search techniques to refine the values of the azimuth and elevation angles θ and φ before quantization. Similar methods can be use to solve equation nos. 11 and 12. An exemplary receiver 202 that can quantize and feedback the azimuth angle θ and the elevation angle φ to the transmitter 212 is discussed next with respect to FIG. 4.

Figure 4:
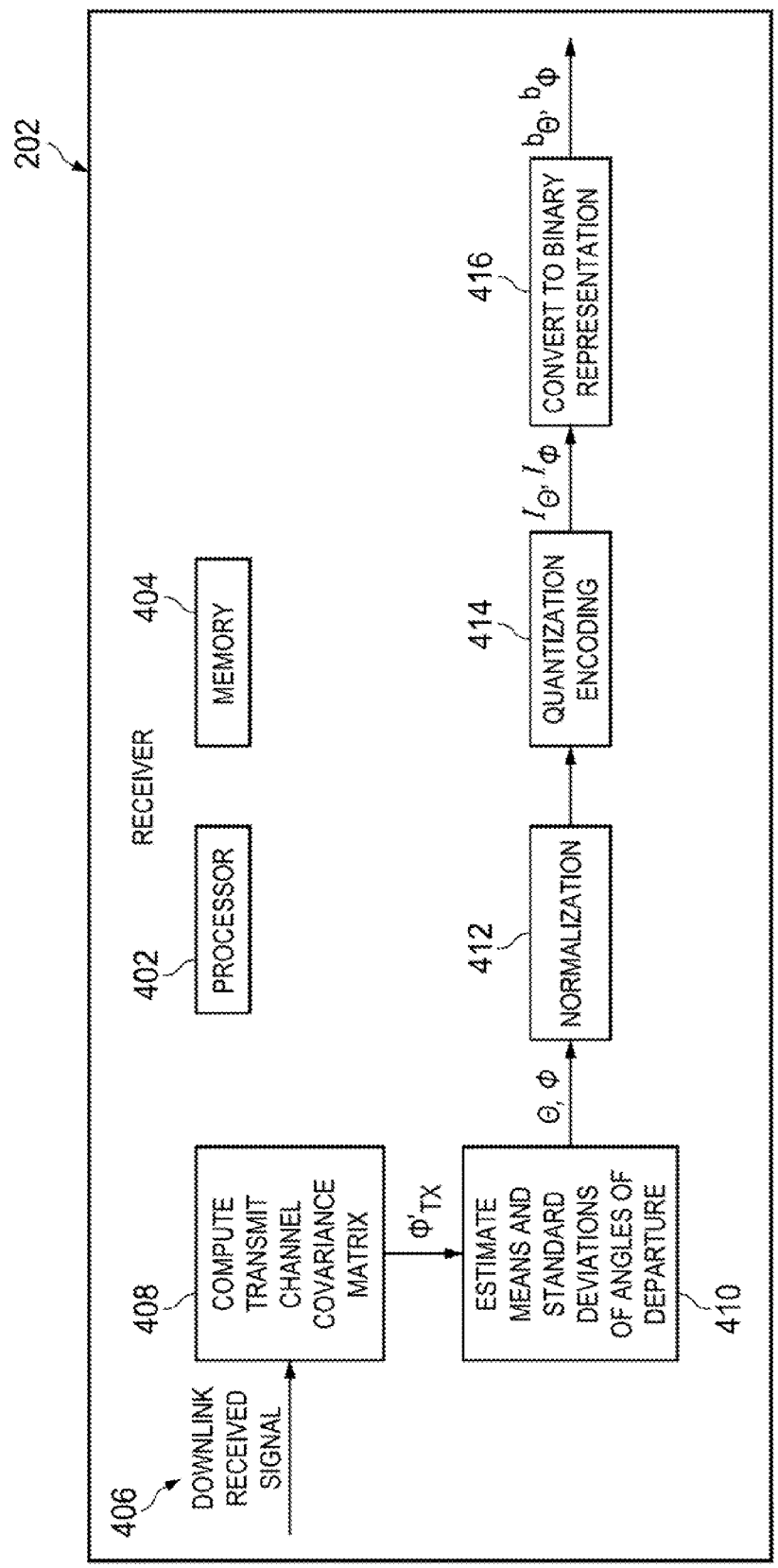
FIG. 4 is a block diagram illustrating the exemplary receiver shown in FIG. 2 configured to quantize an azimuth angle $\theta$ and an elevation angle $\phi$ which are feedback on the slow feedback link to the transmitter in accordance with the first embodiment of the present invention.

Referring to FIG. 4, there is a block diagram illustrating the exemplary receiver 202 that is configured to quantize the azimuth angle θ and the elevation angle φ which are feedback to the transmitter 212 in accordance with the first embodiment of the present invention. As shown, the exemplary receiver 202 includes a processor 402 and a non-transitory memory 404 that stores processor-executable instructions wherein the processor 402 interfaces with the non-transitory memory 404 and executes the processor-executable instructions to: (a) receive a downlink signal from the transmitter 212 (step 406); (b) compute the transmit channel correlation matrix $\phi'_{TX}$ using the received downlink signal (step 408); (c) estimate the elevation angle φ and the azimuth angle from the transmitter 212 to the receiver 202 using the transmit channel correlation matrix $\phi'_{TX}$ (step 410); (d) normalize the elevation angle φ and the azimuth angle θ (step 412); (e) quantization encode the normalized elevation angle φ and the normalized azimuth angle θ to generate an indice $I_\phi$ and the indice $I_\theta$ (step 414); and (f) convert the indice $I_\phi$ and the indice $I_\theta$ to binary representation bθ and bφ which is sent to the transmitter (step 416). If the transmitter 212 has a uniform linear antenna array, then the receiver 202 needs to only compute the azimuth angle θ and send bθ to the transmitter 212.

Procedure for the Transmitter 212 (e.g., Base Station 212)

The transmitter 212 upon receipt of $I_\theta$ and $I_\phi$ (or bθ and bφ) can reconstruct approximations of the azimuth and elevation angles θ and φ by:

$$\hat{\theta} \equiv \pi \frac{I_\theta - 1}{2^{B_\theta}} \text{ and } \hat{\phi} \equiv \frac{\pi}{2} \frac{I_\phi - 1}{2^{B_\phi}}, \quad (14)$$

in the case of uniform quantization. Then, the transmitter 212 based on the reconstructed values of the azimuth and elevation angles θ and φ can compute the $v_T$ using equation nos. 4 and 5, and then compute the transmit channel correlation matrix $\phi_{TX}$ using equation no. 6. An exemplary transmitter 212 that can reconstruct the transmit channel correlation matrix $\phi_{TX}$ using the azimuth angle θ and the elevation angle φ received from the receiver 202 is discussed next with respect to FIG. 5.

Figure 5:
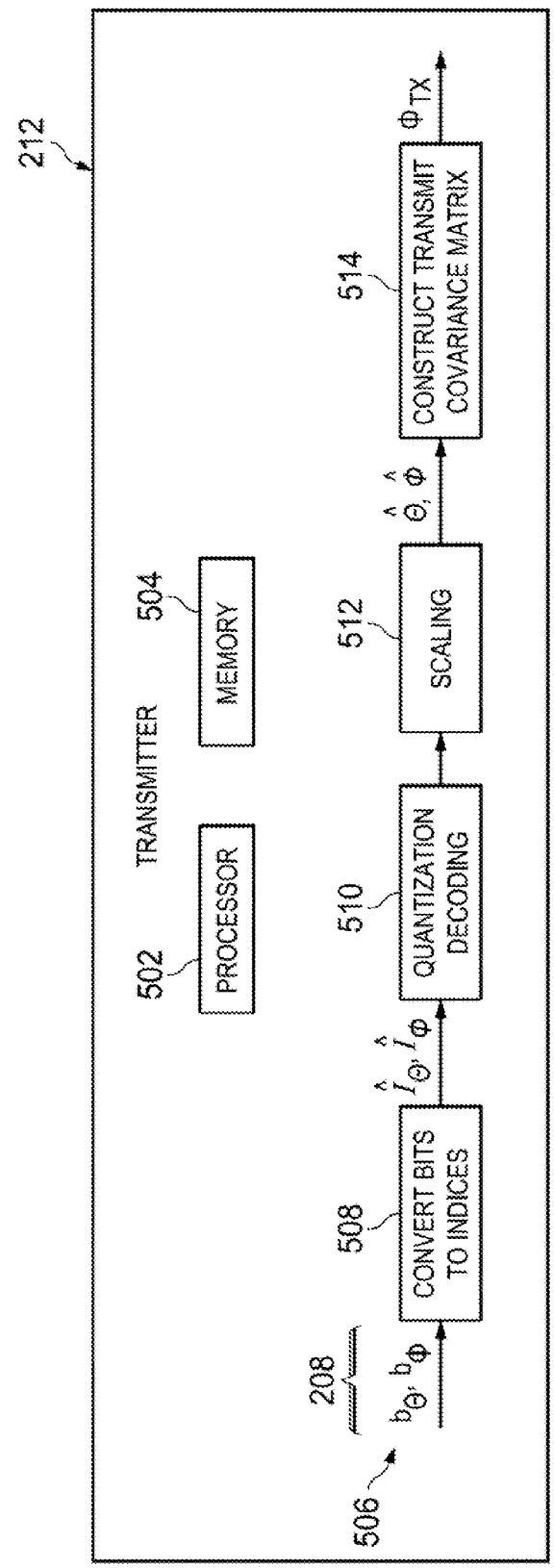
FIG. 5 is a block diagram illustrating the exemplary transmitter shown in FIG. 2 configured to reconstruct the transmit channel correlation matrix $\phi_{TX}$ using feedback information related to the azimuth angle $\theta$ and the elevation angle $\phi$ received on the slow feedback link from the receiver in accordance with the first embodiment of the present invention.

Referring to FIG. 5, there is a block diagram illustrating the exemplary transmitter 212 that is configured to reconstruct the transmit channel correlation matrix $\phi_{TX}$ using feedback information 208 related to azimuth angle θ and the elevation angle φ received from the receiver 202 in accordance with the first embodiment of the present invention. As shown, the exemplary transmitter 212 includes a processor 502 and a non-transitory memory 504 that stores processor-executable instructions wherein the processor 502 interfaces with the non-transitory memory 504 and executes the processor-executable instructions to: (a) receive feedback data bθ and bφ related to channel state information from the receiver 212 (step 506); (b) convert the feedback data bθ and bφ to an estimated indice $I_\theta$ and an estimated indice $I_\phi$ (step 508); (c) quantization decode the estimated indice $I_\theta$ and the estimated indice $I_\phi$ to generate an estimated azimuth angle θ and an estimated elevation angle φ (step 510); (d) scale the estimated azimuth angle θ and the estimated elevation angle φ (step 512); and (e) compute the transmit channel correlation matrix $\phi_{TX}$ using at least the scaled estimated azimuth angle θ and the scaled estimated elevation angle φ (step 514). If the transmitter 212 has a uniform linear antenna array, then the transmitter 212 only needs to receive b from the receiver 202 to have enough information to reconstruct the transmit channel correlation matrix $\phi_{TX}$.

Second Embodiment

The second embodiment is applicable when the transmitter 212 has a transmit antenna with spacing on the order of 0.5-1 wavelength separation and/or a departure angular spread in the order of 4 to 10 degrees. This type of transmitter 212 is commonly used in a micro cellular environment. For these cases, the transmit channel correlation matrix $\phi_{TX}$ can be closely approximated by:

$$\Phi_{TX} \approx g \times \frac{1}{M} \sum_{m=1}^{M} v_r(\theta_m, \phi_m) v_T^H(\theta_m, \phi_m) \quad (15)$$

where $\theta_m \equiv \theta + \sigma_\theta(\Delta\theta_m)$, $\phi_m \equiv \phi + \sigma_\phi(\Delta\phi_m)$, M is a predetermined integer, $\Delta\theta_m$ and $\Delta\phi_m$, are certain predetermined angles, and where $\sigma_\theta$ and $\sigma_\phi$ denote the standard deviations of the angular spread in θ and φ, respectively. In this case, $\{v_T(\theta_m, \phi_m)\}_{m=1}^{M}$ is fully determined by θ, φ, $\sigma_\theta$, and $\sigma_\phi$. All these parameters, unlike the elements in the transmit channel correlation matrix $\phi_{TX}$, have compact support (i.e. limited range), and hence they can be fed back efficiently. In the second embodiment, the receiver 202 characterizes the statistical information captured by the transmit channel correlation matrix $\phi_{TX}$ using the parameters θ, φ, $\sigma_\theta$, and $\sigma_\phi$ (instead of the elements of $\phi_{TX}$), which are easier to compress and feedback to the transmitter 212. A discussion is provided next to explain in detail how the receiver 202 can calculate parameters θ, φ, $\sigma_\theta$ and $\sigma_\phi$ and feedback this information to the transmitter 212 and how the transmitter 212 upon receiving these parameters θ, φ, $\sigma_\theta$, and $\sigma_\phi$ can reconstruct the transmit channel covariance matrix $\phi_{TX}$.

Procedure for the Receiver 202 (UE 202)

According to the second embodiment of the present invention, in cases when there is a larger transmit angular spread, the receiver 202 should also measure and feedback the standard deviations, $\sigma_\theta$ and $\sigma_\phi$, of the azimuth angular spread and the elevation angular spread, respectively, along with the mean azimuth and elevation angles $\theta$ and $\phi$. Also, if the transmitter 212 has a transmit antenna configured to have an uniform linear antenna array then the channel correlation matrix $\phi_{TX}$ can be reproduced if the receiver 202 only provides the azimuth angle $\theta$ and the standard deviation $\sigma_\theta$.

The standard deviations $\sigma_\theta$ and $\sigma_\phi$ can be computed by solving:

$$[\sigma_\theta, \sigma_\phi] = \operatorname*{argmin}_{\sigma'_\theta, \sigma'_\phi} \left\| \frac{\Phi'_{TX}}{tr\{\Phi_{TX}\}} - \int\!\!\int_{\theta', \phi'} v(\theta', \phi') v^H(\theta', \phi') dF_\theta\!\left(\frac{\theta'-\theta}{\sigma'_\theta}\right) dF_\phi\!\left(\frac{\phi'-\phi}{\sigma'_\phi}\right) \right\|_F^2 \quad (16)$$

where $\theta$ and $\phi$ can be obtained from equation nos. 9 and 10. If the transmitter 212 has the uniform linear antenna array, then the receiver 202 can compute the standard deviation $\sigma_{\theta\%}$ of the equivalent azimuth angle $\theta^\%$ by solving:

$$\sigma_{\theta\%} = \operatorname*{argmin}_{\sigma'_{\theta\%}} \left\| v'_1 - \int_{\theta^\%} v(\theta^\%) dF_\theta\!\left(\frac{\theta^\% - \theta^\%}{\sigma'_{\theta\%}}\right) \right\|^2, \quad (17)$$

where $\theta^\%$ can be obtained from equation nos. 11 or 12.

Thereafter, the standard deviations $\sigma_\theta \in [0, \pi]$ and $\sigma_\phi \in [0, \pi/2]$ can be quantized and fed back in similar manners as in the first embodiment by computing the corresponding indices $I_{\sigma_\theta}$ and $I_{\sigma_\phi}$ at the receiver 202, and the corresponding reconstructions, $\hat{\sigma}_\theta$ and $\hat{\sigma}_\phi$, at the transmitter 212. An exemplary receiver 202 that can quantize and feedback the parameters $\theta$, $\phi$, $\sigma_\theta$, and $\theta_\phi$ to the transmitter 212 is discussed next with respect to FIG. 6.

Figure 6:
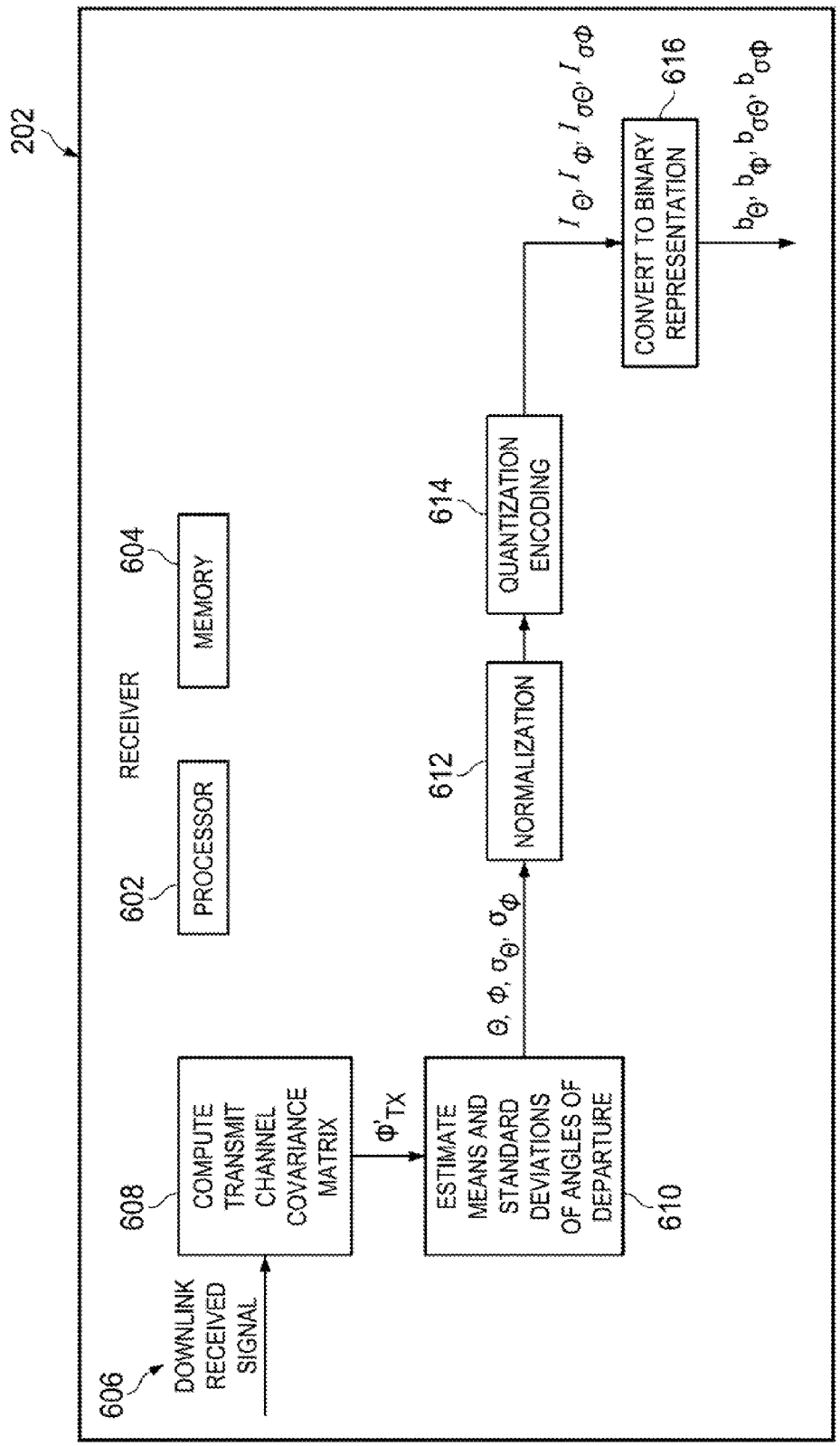
FIG. 6 is a block diagram illustrating the exemplary receiver shown in FIG. 2 configured to quantize an elevation angle $\phi$, a standard deviation $\rho_\phi$, an azimuth angle $\theta$, and a standard deviation $\sigma_\theta$ which are feedback on the slow feedback link to the transmitter in accordance with a second embodiment of the present invention.

Referring to FIG. 6, there is a block diagram illustrating the exemplary receiver 202 that is configured to quantize the elevation angle $\phi$, the standard deviation $\sigma_\phi$, the azimuth angle $\theta$, and the standard deviation $\sigma_\theta$ which are feedback to the transmitter 212 in accordance with the second embodiment of the present invention. As shown, the exemplary receiver 202 includes a processor 602 and a non-transitory memory 604 that stores processor-executable instructions wherein the processor 602 interfaces with the non-transitory memory 604 and executes the processor-executable instructions to: (a) receive a downlink signal from the transmitter 212 (step 606); (b) compute the transmit channel correlation matrix $\phi_{TX}$ using the received downlink signal (step 608); (c) estimate the elevation angle $\phi$, the standard deviation $\sigma_\phi$, the azimuth angle $\theta$, and the standard deviation $\sigma_\theta$ using the transmit channel correlation matrix $\phi_{TX}$ (step 610); (d) normalize the elevation angle $\phi$, the standard deviation $\sigma_\phi$, the azimuth angle $\theta$, and the standard deviation $\sigma_\theta$ (step 612); (e) quantization encode the normalized elevation angle $\phi$, the normalized standard deviation $\sigma_\phi$, the normalized azimuth angle $\theta$, and the normalized standard deviation $\sigma_\theta$ to generate an indice $I_\phi$, an indice $I_{\sigma_\phi}$, the indice $I_o$, and an indice $I_{\sigma_\theta}$ (step 614); and (f) convert the indice $I_\phi$, the indice $I_{\sigma_\phi}$, the indice $I_\theta$, and the indice $I_{\sigma_\theta}$ to binary representation $b_\phi$, $b_{\sigma_\phi}$, $b_\theta$, and an $b_{\sigma_\theta}$ which is sent to the transmitter (step 616). If the transmitter 212 has a uniform linear antenna array, then the receiver 202 needs to only compute the azimuth angle $\theta$ and the standard deviation $\sigma_\theta$, and send $b_\theta$ and $b_{\sigma_\theta}$ to the transmitter 212.

Procedure for the Transmitter 212 (Base Station 212)

Figure 7:
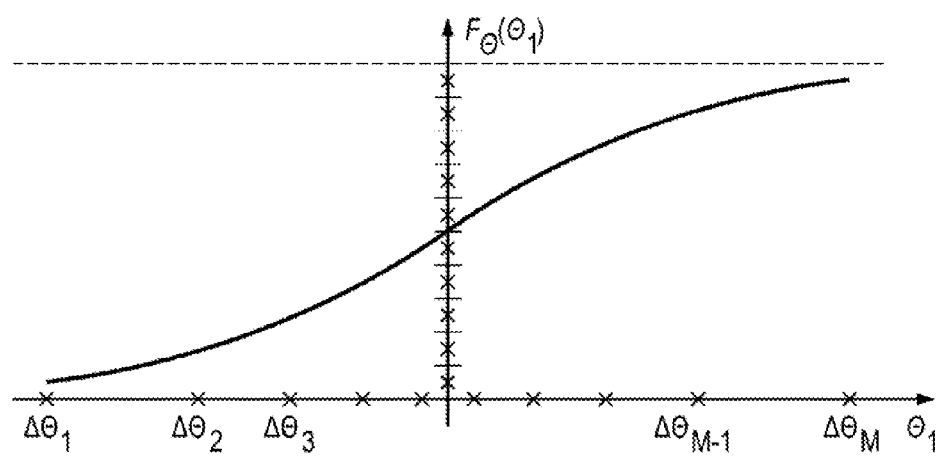
FIGS. 7-8 are diagrams used to explain how the exemplary transmitter shown in FIG. 2 can be configured to reconstruct the transmit channel correlation matrix $\phi_{TX}$ using feedback information related to the azimuth angle $\theta$, the elevation angle $\phi$, the standard deviation $\sigma_\phi$, and the estimated standard deviation $\sigma_\theta$ received on the slow feedback link from the receiver in accordance with the second embodiment of the present invention.

The transmitter 212 upon receiving $b_\theta$, $b_{\sigma_\phi}$, $b_\theta$, and an $b_{\sigma_\theta}$ is able to reconstruct the values of $\theta$, $\phi$, $\sigma_\theta$, and $\sigma_\phi$, and then compute the transmit channel correlation matrix $\phi_{TX}$ by using equation no. 15 based on a pre-defined set of "template" angles $\{\Delta\theta_m\}_{m=1}^M$ and $\{\Delta\phi_3\}_{m=1}^M$. FIG. 7 is a graph which indicates that these pre-defined angles may be computed based on the underlying normalized (zero mean and unit variance) probability distribution functions, denoted by $F_\theta(x)$ and $T_\phi(x)$ for $\theta$ and $\phi$ respectively, through companding as:

$$\Delta\theta_m = F_\theta^{-1}\!\left(\frac{m-1/2}{M}\right) \text{ and } \Delta\phi_m = F_\theta^{-1}\!\left(\frac{m-1/2}{M}\right). \quad (18)$$

Reasonable choices for $F_\theta(x)$, as well as $F_\phi(x)$, are the Gaussian or Laplacian distribution functions. An exemplary transmitter 212 that can reconstruct the transmit channel correlation matrix $\phi_{TX}$ using the parameters $\theta$, $\phi$, $\sigma_\theta$, and $\sigma_\phi$ received from the receiver 202 is discussed next with respect to FIG. 8.

Figure 8:
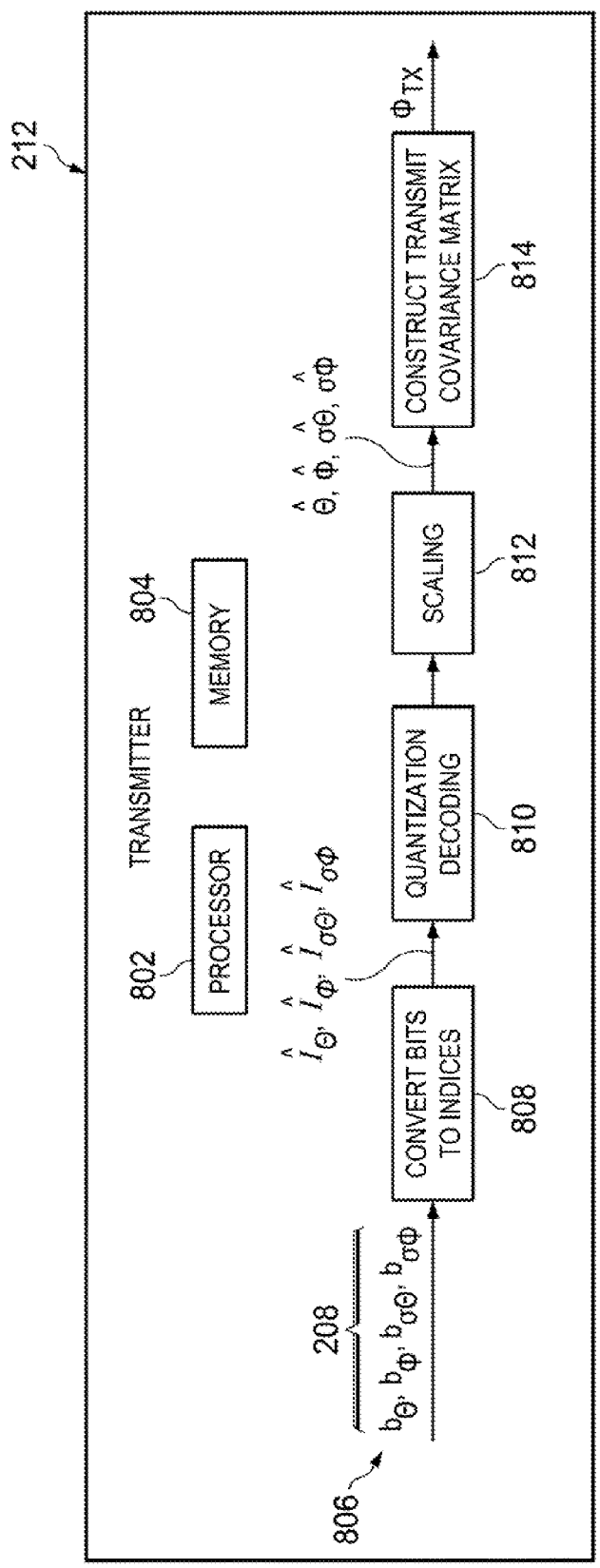

Referring to FIG. 8, there is a block diagram illustrating the exemplary transmitter 212 that is configured to reconstruct the transmit channel correlation matrix $\phi_{TX}$, using feedback information 208 related to the azimuth angle $\theta$, the elevation angle $\phi$, the standard deviation $\sigma_\phi$, and the estimated standard deviation $\sigma_\theta$ received from the receiver 202 in accordance with the second embodiment of the present invention. As shown, the exemplary transmitter 212 includes a processor 802 and a non-transitory memory 804 that stores processor-executable instructions wherein the processor 802 interfaces with the non-transitory memory 804 and executes the processor-executable instructions to: (a) receive feedback data $b_\phi$, $b_{\sigma_\phi}$, $b_\theta$, and $b_{\sigma_\theta}$ related to channel state information from the receiver 212 (step 806); (b) convert the feedback data $b_\phi$, $b_{\sigma_\phi}$, $b_\theta$, and an $b_{\sigma_\theta}$ to an estimated indice $I_\phi$ an estimated indice $I_{\sigma_\phi}$, an estimated indice $I_\theta$ and an estimated indice $I_{\sigma_\theta}$ (step 808); (c) quantization decode the estimated indice $I_\phi$, the estimated indice $I_{\sigma_\phi}$, the estimated indice $I_\theta$ and the estimated indice $I_{\sigma_\theta}$ to generate an estimated elevation angle $\phi$, an estimated standard deviation $\sigma_\phi$, an estimated azimuth angle $\theta$, and an estimated standard deviation $\sigma_\theta$ (step 810); (d) scale the estimated elevation angle $\phi$, the estimated standard deviation $\sigma_\phi$, the estimated azimuth angle $\theta$, and the estimated standard deviation $\sigma_\theta$ (step 812); and (e) compute the transmit channel correlation matrix $\phi_{TX}$ (using at least the scaled estimated elevation angle $\phi$, the scaled estimated standard deviation $\sigma_\phi$, the scaled estimated azimuth angle $\theta$, and the scaled estimated standard deviation $\sigma_\theta$ (step 814). If the transmitter 212 has a uniform linear antenna array, then the transmitter 212 only needs to receive $b_\theta$ and $b_{\sigma_\theta}$ from the receiver 202 to have enough information to reconstruct the transmit channel correlation matrix $\phi_{TX}$.

Third Embodiment

The third embodiment is a refinement to the feedback procedures applicable to the first two embodiments. This embodiment cuts down the amount of feedback bits by recognizing the large-scale reciprocity of the UL and DL channels. In this regard, the two scalars, $\theta$ and $\phi$, may also be measured from the uplink at the transmitter 212. However, for the receiver 202 and the transmitter 212 to have a common unitary transform matrix $U_T$, some information about $\theta$ and $\phi$ (as well as $\sigma_\theta$, and $\sigma_\phi$) need to be fed back from the receiver 202 to the transmitter 212 or, alternatively, be signaled from the transmitter 212 to the receiver 202. According to the third embodiment, a method is disclosed to further reduce feedback (or signaling) requirement for θ and φ (as well as $\sigma_\theta$, and $\sigma_\phi$) by exploiting the knowledge that the transmitter 212 (or alternatively the receiver 202) can measure a close approximation of these parameters in the reverse link. Then, the receiver 202 feeds back only the least significant digits (with respect to a certain pre-defined base) to the transmitter 212 and allow the transmitter's measurements from the uplink to determine the more significant digits. An optional dithering noise sequence may also be added to average out the boundary effects of the quantization intervals.

The transmitter 212 can acquire reasonable estimates of the mean angles, θ and φ, as well as the standard deviations, $\sigma_\theta$ and $\sigma_\phi$, which are statistical information about the channel from the measurements on the uplink because the channel statistics of the downlink are reciprocal of those in the uplink (and vice versa). Although the receiver 202 does not know these estimates, the receiver 202 can still exploit the fact that such side information is available at the transmitter 212 to reduce the amount of feedback for θ, φ, $\sigma_\theta$ and $\sigma_\phi$.

Specifically, one way this can be accomplished is for the receiver 202 to feedback only the least significant bits of the binary representations of $I_\theta$, $I_\phi$, $I_{\sigma_\theta}$ and $I_{\sigma_\phi}$ to the transmitter 212. For example, suppose that $B_\theta$=5 and that $I_\theta$ has the binary representation of 01001. Then, the receiver 202 will only feedback the "fine" information captured by the least significant $B_\theta^\%$=2 bits of the binary representation of $I_\theta$, which are 01 (01001). The basic idea is that the transmitter 212 can obtain the "coarse" information captured by the $(B_\theta - B_\theta^\%)$=3 more significant bits, namely 010 (01001) in the example, from the estimates of angles obtained from uplink measurements. Due to channel statistical reciprocity, the uplink angle estimates allow the transmitter 212 to compute the $(B_\theta - B_\theta^\%)$ significant bits correctly with high probability $B_\theta^\%$ is chosen properly. These bits should also agree with those corresponding bits generated at the receiver 202 side, with high probability, based the downlink measurements so that no additional signaling is needed on the downlink. Combining these $(B_\theta - B_\theta^\%)$ bits and those $B_\theta^\%$ fed back from the receiver 202, the transmitter 212 can reconstruct an approximation of $\hat{\theta}$. Similar procedures can be applied to φ, $\sigma_\theta$, and $\sigma_\phi$ as well.

An optional dithering signal based on a predetermined pseudo-random dithering sequence may be applied at the receiver 202 and the transmitter 212 to average out the boundary effect between the "coarse" and the "fine" information. For example, the receiver 202 can compute and feedback the following indices:

$$I_\theta \equiv \left\lfloor 2^{B_\theta}\left(\frac{\theta}{\pi} - A_\theta \varepsilon_\theta\right)\right\rfloor + 1 \text{ and } I_\phi \equiv \left\lfloor 2^{B_\phi}\left(\frac{\phi}{\pi/2} - A_\phi \varepsilon_\phi\right)\right\rfloor + 1, \quad (19)$$

where $\varepsilon_\theta$ and $\varepsilon_\phi$ may be obtained from a pre-stored pseudo-random dithering sequence of real numbers from the interval [0.5, 0.5], while $A_\theta$ and $A_\phi$ are pre-determined positive numbers. Reasonable choices for $A_\theta$ and $A_\phi$ are $2^{-(B_\theta - B_\theta^\%)}$ and $2^{-(B_\phi - B_\phi^\%)}$, respectively, where $B_\phi^\%$ denotes the least significant bits. Upon receipt of $I_\theta$ and $I_\phi$, the transmitter 212 can reconstruct approximations of θ and φ by:

$$\hat{\theta} \equiv \pi\left(\frac{I_\theta - 1}{2^{B_\theta}} + A_\theta \varepsilon_\theta\right) \text{ and } \hat{\phi} \equiv \frac{\pi}{2}\left(\frac{I_\phi - 1}{2^{B_\phi}} + A_\phi \varepsilon_\phi\right). \quad (20)$$

The operations performed at the receiver 202 according to the invention is described in more detail below with respect to FIG. 9, where $\bar{b}_\theta$, $\bar{b}_\phi$, $\bar{b}_{\sigma_\theta}$, and $\bar{b}_{\sigma_\phi}$ denote the least significant bits extracted from the full binary representation of θ, φ, $\sigma_\theta$ and $\sigma_\phi$, respectively. Upon receipt of $\bar{b}_\theta$, $\bar{b}_\phi$, $\bar{b}_{\sigma_\theta}$, and $\bar{b}_{\sigma_\phi}$ from the receiver 202, the corresponding operations performed at the transmitter 212 to reconstruct θ, φ, $\sigma_\theta$ and $\sigma_\phi$ are described in more detail below with respect to FIG. 10, where $\hat{b}_\theta$, $\hat{b}_\phi$, $\hat{b}_{\sigma_\theta}$, and $\hat{b}_{\sigma_\phi}$ denote the bits of larger significance in those binary representations of θ, φ, $\sigma_\theta$ and $\sigma_\phi$ estimated from the uplink measurement, respectively. Alternatively, if the transmitter 212 has a transmit antenna with small spacing on the order of 0.5 wavelength separation and with a departure angular spread on the order of 2 to 3 degrees or less. Then, the receiver 202 only needs to feedback least significant bits related to the azimuth angle θ and the elevation angle φ to the transmitter 212. If this transmitter 212 also has a transmit antenna configured to have an uniform linear antenna array, then the receiver 202 only needs to feedback least significant bits related to the azimuth angle θ to the transmitter 212.

Procedure for the Receiver 202 (UE 202)

Figure 9:
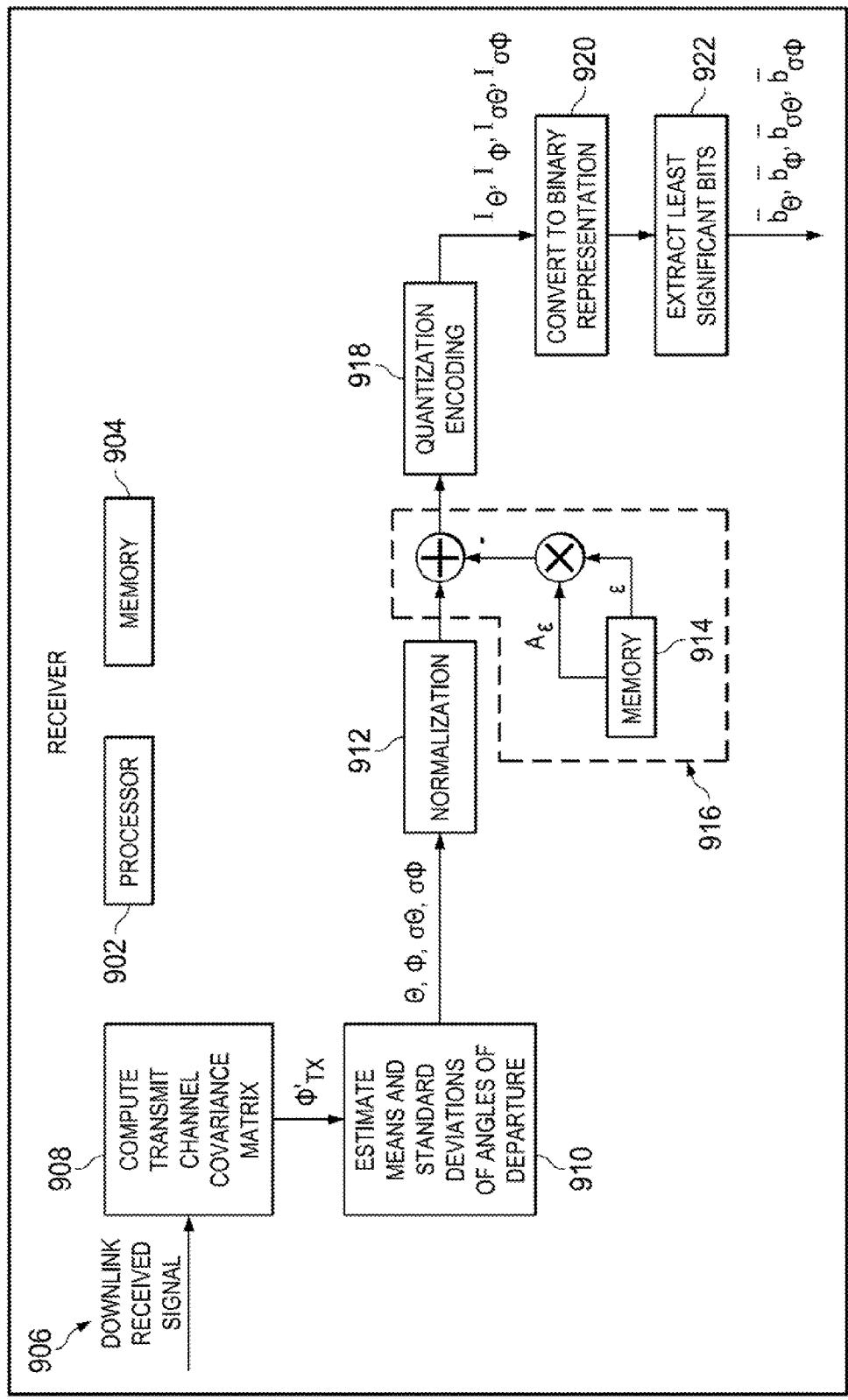
FIG. 9 is a block diagram of the exemplary receiver shown in FIG. 2 configured to quantize least significant bits related to the parameters $\theta$, $\phi$, $\sigma_\theta$, and $\sigma_\phi$ while utilizing an optional dithering signal and then feedback the least significant bits on the slow feedback link to the transmitter in accordance with a third embodiment of the present invention.

Referring to FIG. 9, there is shown an exemplary receiver 202 that can quantize least significant bits related to the parameters θ, φ, $\sigma_\theta$, and $\sigma_\phi$ while utilizing the optional dithering signal and then feedback the least significant bits to the transmitter 212. As shown, the exemplary receiver 202 includes a processor 902 and a non-transitory memory 904 that stores processor-executable instructions wherein the processor 902 interfaces with the non-transitory memory 904 and executes the processor-executable instructions to: (a) receive a downlink signal from the transmitter 212 (step 906); (b) compute the transmit channel correlation matrix $\phi_{TX}$ using the received downlink signal (step 908); (c) estimate the elevation angle φ, the standard deviation $\sigma_\phi$, the azimuth angle θ, and the standard deviation $\sigma_\theta$ using the transmit channel correlation matrix $\phi'_{TX}$ (step 910); (d) normalize the elevation angle φ, the standard deviation $\sigma_\phi$, the azimuth angle θ, and the standard deviation $\sigma_\theta$ (step 912); (e) apply a dithering signal based on $\varepsilon_\theta$, $\varepsilon_\phi$, $A_\theta$ and $A_\phi$ obtained from a memory 914 to the normalized elevation angle φ, the normalized standard deviation $\sigma_\phi$, the normalized azimuth angle θ, and the normalized standard to deviation $\sigma_\theta$ (step 916); (f) quantization encode the normalized elevation angle φ, the normalized standard deviation $\sigma_\phi$, the normalized azimuth angle θ, and the normalized standard deviation $\sigma_\theta$ to generate an indice $I_\phi$, an indice $I_{\sigma_\phi}$, the indice $I_\theta$, and an indice $I_{\sigma_\theta}$ (step 918); and (g) convert the indice $I_\phi$, the indice $I_{\sigma_\phi}$, the indice $I_\theta$, and the indice $I_{\sigma_\theta}$ to binary representation $b_\phi$, $b_{\sigma_\phi}$, $b_\theta$, and an $b_{\sigma_\theta}$ (step 920); (h) extract the least significant bits from $b_\phi$, $b_{\sigma_\phi}$, $b_\theta$, and an $b_{\sigma_\theta}$ to form $\bar{b}_\phi$, $\bar{b}_{\sigma_\phi}$, $\bar{b}_\theta$, $\bar{b}_{\sigma_\theta}$, and which are sent to the transmitter (step 922).

Procedure for the Transmitter 212 (Base Station 212)

Figure 10:
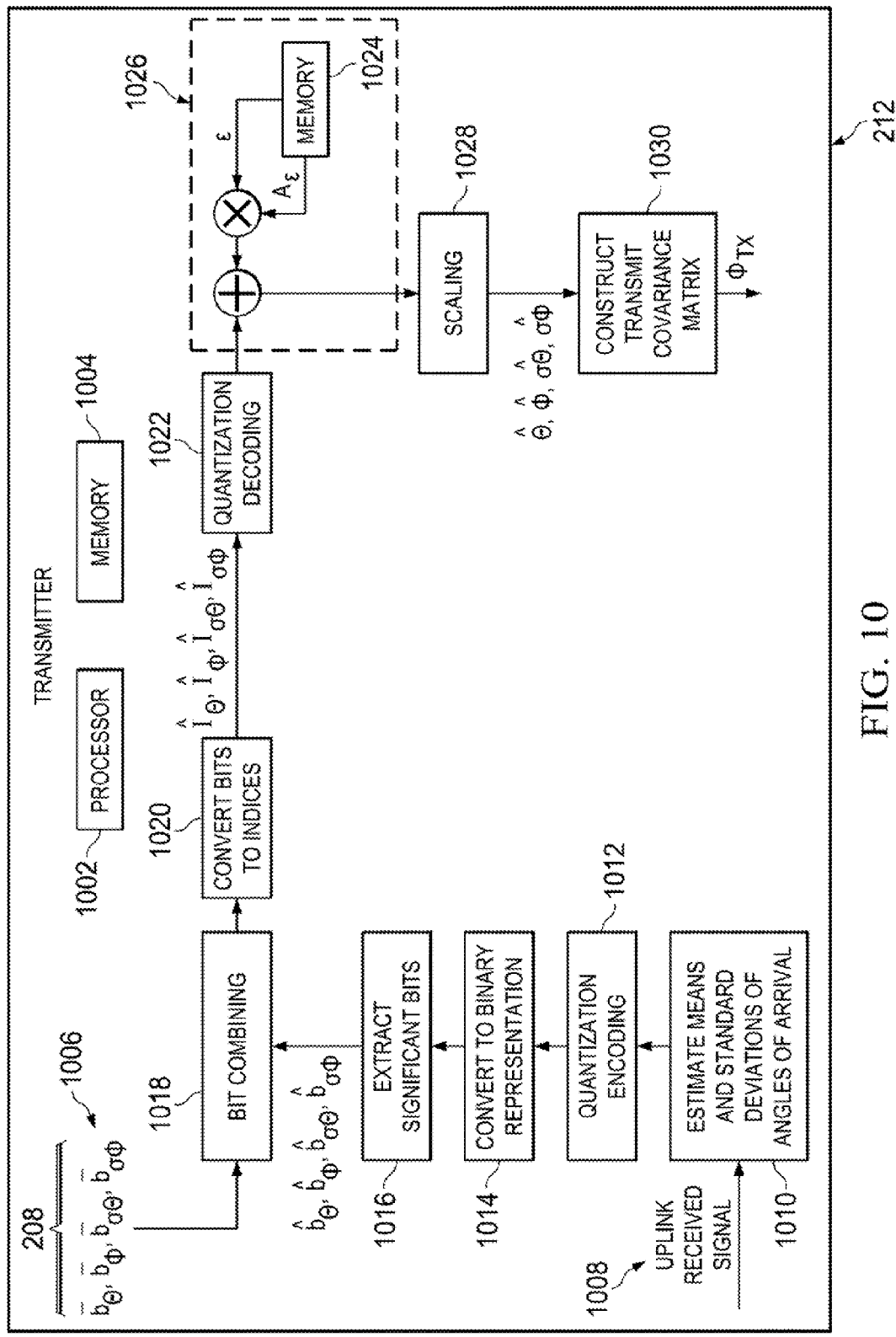
FIG. 10 is a block diagram of the exemplary transmitter shown in FIG. 2 that is configured to reconstruct the transmit channel correlation matrix $\phi_{TX}$ using an optional dithering signal and feedback information containing $\bar{b}_\theta$, $\bar{b}_\phi$, $\bar{b}_{\sigma_\theta}$, and $\bar{b}_{\sigma_\phi}$ received on the slow feedback link from the receiver in accordance with the third embodiment of the present invention.

Referring to FIG. 10, there is a block diagram illustrating the exemplary transmitter 212 that is configured to reconstruct the transmit channel correlation matrix $\phi_{TX}$ using the optional dithering signal and feedback information 208 containing $\bar{b}_\theta$, $\bar{b}_\phi$, $\bar{b}_{\sigma_\theta}$ and $\bar{b}_{\sigma_\phi}$ received from the receiver 202. As shown, the exemplary transmitter 212 includes a processor 1002 and a non-transitory memory 1004 that stores processor-executable instructions wherein the processor 1002 interfaces with the non-transitory memory 1004 and executes the processor-executable instructions to: (a) receive feedback data $\bar{b}_\theta$, $\bar{b}_\phi$, $\bar{b}_{\sigma_\theta}$, and $\bar{b}_{\sigma_\phi}$ to channel state information from the receiver 212 (step 1006); (b) receive an uplink signal (step 1008); (c) estimate the parameters θ, φ, $\sigma_\theta$ and $\sigma_\phi$ using the received uplink signal (step 1010); (d) quantization encode the estimated parameters θ, φ, $\sigma_\theta$ and $\sigma_\phi$ (step 1012); (e) convert the encoded parameters θ, φ, $\sigma_\theta$ and $\sigma_\phi$ to binary representation (step 1014); (0 extract most significant bits from the binary representation of the parameters θ, φ, $\sigma_\theta$, and $\sigma_\phi$ to obtain $\hat{b}_\theta$, $\hat{b}_\phi$, $\hat{b}_{\sigma_\theta}$, and $\hat{b}_{\sigma_\phi}$ (step 1016); (g) combine $\bar{b}_\theta$, $\bar{b}_\phi$, $\bar{b}_{\sigma_\theta}$, and $\bar{b}_{\sigma_\phi}$ and $\hat{b}_\theta$, $\hat{b}_\phi$, $\hat{b}_{\sigma_\theta}$, and $\hat{b}_{\sigma_\phi}$ (step 1018); (h) convert the combined bits to an estimated indice $I_\phi$ an estimated indice $I_{\sigma_\phi}$, an estimated indice $I_\theta$ and an estimated indice $I_{\sigma_\theta}$ (step 1020); (i) quantization decode the estimated $I_\phi$ $I_{\sigma_\phi}$, $I_\theta$ and $I_{\sigma_\theta}$ to generate an estimated elevation angle φ, an estimated standard deviation $\sigma_\phi$, an estimated azimuth angle θ, and an estimated standard deviation $\sigma_\theta$ (step 1022); (j) apply a dithering signal based on $\epsilon_\theta$, $\epsilon_\phi$, $A_\theta$ and $A_\phi$ obtained from a memory 1024 to the estimated φ, $\sigma_\phi$, θ, $\sigma_\theta$ (step 1026); (k) scale the estimated elevation angle φ, the estimated standard deviation $\sigma_\phi$, the estimated azimuth angle θ, and the estimated φ, $\sigma_\phi$, θ, $\sigma_\theta$ (step 1028); and (e) compute the transmit channel correlation matrix $\phi_{TX}$ using at least the scaled estimated elevation angle φ, the scaled estimated standard deviation $\sigma_\phi$, the scaled estimated azimuth angle θ, and the scaled estimated standard deviation $\sigma_\theta$ (step 1030).

Simulation

Figure 11:
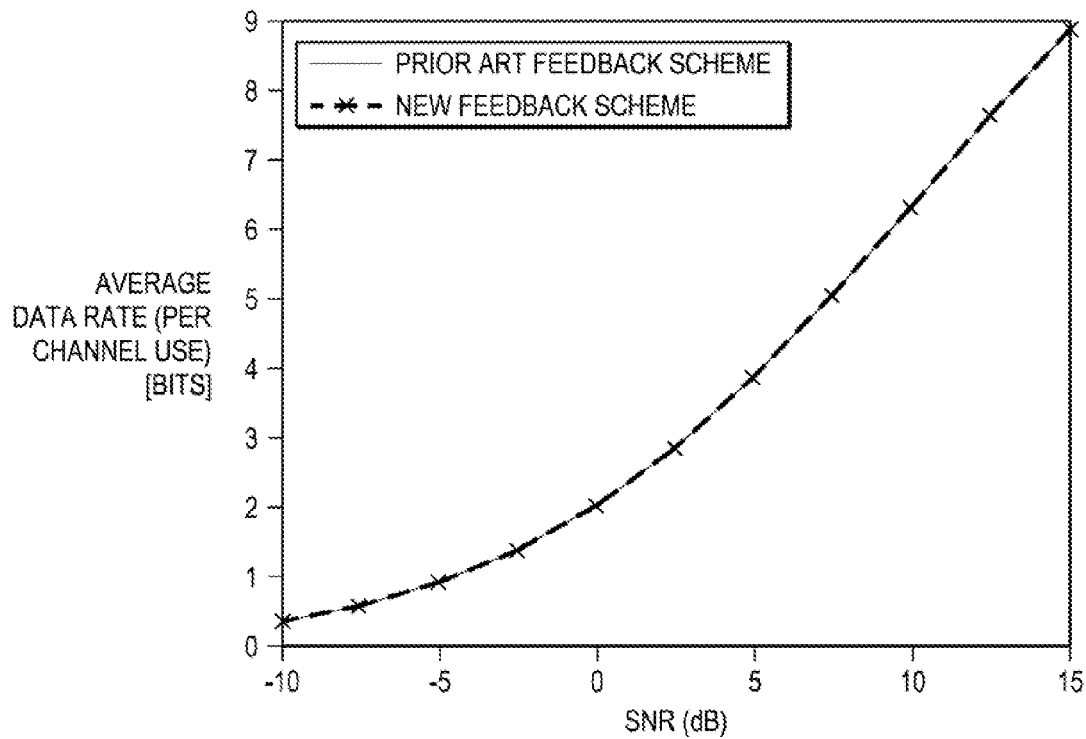
FIG. 11 is a graph obtain during the simulation of the exemplary receiver and transmitter shown in FIG. 2 and configured in accordance with the first embodiment of the present invention which shows the performance of the present invention for a 3GPP Typical Urban Macro Channel ($n_T$=4, $n_R$=2)
Figure 12:
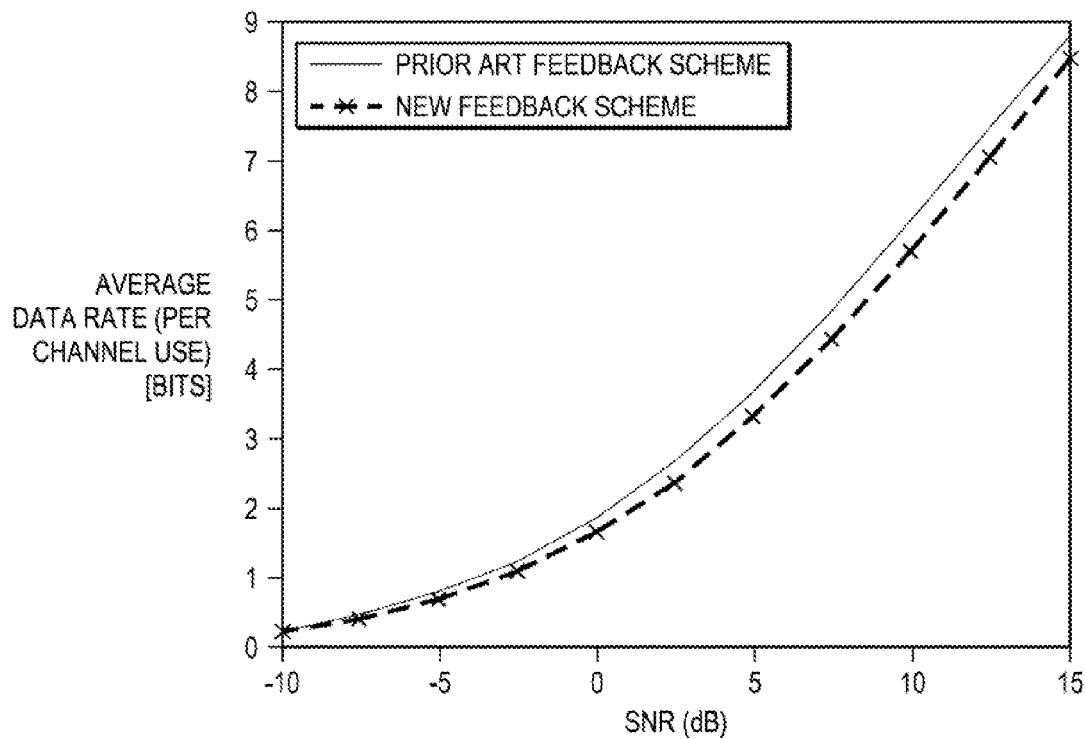
FIG. 12 is a graph obtain during the simulation of the exemplary receiver and transmitter shown in FIG. 2 and configured in accordance with the first embodiment of the present invention which shows the performance of the present invention for a 3GPP Typical Urban Micro Channel ($n_T=4$, $n_R=2$).

In this section, the performance benefit of the present invention is demonstrated by using a MIMO-OFDM system. The overall system bandwidth was assumed to be 5 MHz with a FFT size of 512. The number of occupied subcarriers was 300, which had been equally divided into 25 chunks (12 subcarriers each). The subcarrier spacing was 15 kHz. The performance was simulated with the 3GPP spatial channel model with the pedestrian B channel profile in a macro-cell and micro-cell environment. FIGS. 11 and 12 illustrate graphs which show the performance of the present invention when the transmitter 212 has four-transmit antennas and the receiver 202 has two-receive antennas. The performance measure used for evaluation was the average data rate (per channel use) plotted versus SNR, where SNR is define as a ratio of the total transmitted power to the variance of the noise at the receiver 202. In the same graphs, the average data rate was plotted corresponding to the feedback scheme of U.S. Patent Application No. 2009/0016425 A1 (reference no. 4). FIG. 11 corresponds to macro-cell environment with moderate angular spread, and FIG. 12 corresponds to micro-cell environment with large angular spread. As can be seen, in the macro-cell environment the performance of the present invention with only the feedback of mean azimuth angle θ and the scheme associated with U.S. Patent Application No. 2009/0016425 A1 with the full feedback of the transmit correlation matrix $\phi_{TX}$ are almost identical. In the micro-cell environment with larger angular spread, the performance gap between the scheme of the present invention and the scheme of U.S. Patent Application No. 2009/0016425 A1 does not exceed 1.5 dB.

From the foregoing, one skilled in the art will appreciate that the present invention is aimed, at least, to provide a receiver 202 and a method for reducing an amount of channel state information related to a transmit channel correlation matrix $\phi_{TX}$ that is feedback on a slow feedback channel to a transmitter 212. Moreover, the present invention relates to a transmitter 212 and method for reconstructing the transmit channel correlation matrix $\phi_{TX}$ using the reduced channel state feedback information received from the receiver 202. In addition, to providing a method to improve the compression efficiency of advanced channel feedback techniques, the present invention by providing the transmitter 212 with information related to the transmit channel correlation matrix $\phi_{TX}$ means that this information can be used to enhance many coordinated beamforming techniques, such as the techniques described in reference no. 5 to yield a promising system performance gain. Furthermore, the present invention of feeding back the transmit covariance matrix $\phi_{TX}$ can be used in conjunction with known techniques (such as those described in reference 5) of coordinating transmit beamforming directions for one or more base stations. In this application, the base station would also need to know the transmit covariance matrices $\phi_{TX}$s of one or more mobiles to select proper transmit beamforming directions for all users so that mutual interference among users can be minimized and the total user data throughput can be maximized. Lastly, one skilled in the art should appreciate that the present invention is not dependent upon the teachings in U.S. Patent Application No. 2009/0016425 A1 in that the feedback information 208 does not need to be sent on the slow feedback link 210 nor does the present invention require that compress channel response information 204 be sent to the transmitter 212.

REFERENCES

1. A. Goldsmith and P. Varaiya, "Capacity of fading channels with channel side information," *IEEE Trans. Info. Thy.*, vol. 43, pp. 1986-1992, November 1997.
2. E. Telatar, "Capacity of multi-antenna Gaussian channels," *Euro. Trans. Telecomm. ETT*, vol. 10, no. 6, pp. 585-596, November 1999.
3. G. J. Foschini, "Layered space-time architecture for wireless communication in fading environments when using multi-element antennas," *Bell Labs Tech. Journal*, pp. 41-50, 1996.
4. U.S. Patent Application No. 2009/0016425 A1
5. M. Schubert et al., "Solution of the Multiuser Downlink Beamforming Problem with Individual SINR Constraints", IEEE Transactions on Vehicular Technology, Vol. 53, No. 1, pp. 18-28, January 2004.

The content of these references are hereby incorporated by reference herein.

to Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

What is claimed is:

1. A method implemented by a receiver for feeding channel state information back to a transmitter, the method comprising the steps of:
   receiving a downlink signal from the transmitter;
   computing a transmit channel correlation matrix $\Phi'_{TX}$ using the received downlink signal;
   estimating an elevation angle φ and the azimuth angle θ from the transmitter to the receiver using the transmit channel correlation matrix $\Phi'_{TX}$; and
   sending data related to the elevation angle φ and the azimuth angle θ to the transmitter.

2. The method of claim 1, wherein the step of sending data related to the elevation angle φ and the azimuth angle θ to the transmitter further includes determining most significant digits and least significant digits associated with each of the elevation angle φ and the azimuth angleθ, and then sending the least significant digits associated with each of the elevation angle φ and the azimuth angle θ to the transmitter.

3. The method of claim 2, wherein the determining step further comprises applying predetermined pseudo-random dithering sequences to average out boundary effects between the most significant digits and the least significant digits associated with the elevation angle $\phi$ and the azimuth angle $\theta$.

4. The method of claim 1, wherein the step of sending data related to at least the azimuth angle $\theta$ to the transmitter further includes determining most significant digits and least significant digits associated with the azimuth angle $\theta$ and sending the least significant digits associated with the azimuth angle $\theta$ to the transmitter.

5. The method of claim 1, wherein the determining step further comprises applying a predetermined pseudo-random dithering sequence to average out a boundary effect between the most significant digits and the least significant digits associated with the azimuth angle $\theta$.

6. A method implemented by a receiver for feeding channel state information back to a transmitter, the method comprising the steps of:
receiving a downlink signal from the transmitter;
computing a transmit channel correlation matrix $\Phi'_{TX}$ using the received downlink signal;
estimating an elevation angle $\phi$, and a standard deviation of an angular spread in the elevation angle $\theta$ from the transmitter to the receiver,
estimating an azimuth angle $\theta$, and a standard deviation $\sigma_\phi$ of an angular spread in the azimuth angle $\theta$ from the transmitter to the receiver using the transmit channel correlation matrix $\Phi'_{TX}$; and
sending data related to the elevation angle $\phi$, the standard deviation $\sigma_\phi$, the azimuth angle $\theta$, and the standard deviation $\sigma_\phi$ to the transmitter.

7. The method of claim 6, wherein the step of sending data related to the elevation angle $\phi$, the standard deviation $\sigma_\phi$, the azimuth angle $\theta$, and the standard deviation $\sigma_\theta$ to the transmitter further includes determining most significant digits and least significant digits associated with each of the elevation angle $\phi$, the standard deviation $\sigma_\phi$, the azimuth angle $\theta$, and the standard deviation $\sigma_\theta$, and then sending the least significant digits associated with each of the elevation angle $\phi$, the standard deviation $\sigma_\phi$, the azimuth angle $\theta$, and the standard deviation $\sigma_\theta$ to the transmitter.

8. The method of claim 7, wherein the determining step further comprises applying predetermined pseudo-random dithering sequences to average out boundary effects between the most significant digits and the least significant digits associated with the elevation angle $\phi$, the standard deviation $\sigma_\phi$, the azimuth angle $\theta$, and the standard deviation $\sigma_\theta$.

9. A method implemented by a receiver for feeding channel state information back to a transmitter, the method comprising the steps of:
receiving a downlink signal from the transmitter;
computing a transmit channel correlation matrix $\Phi'_{TX}$ using the received downlink signal;
estimating an azimuth angle $\theta$, and a standard deviation $\sigma_\theta$ of an angular spread in the azimuth angle $\theta$ from the transmitter to the receiver using the transmit channel correlation matrix $\Phi'_{TX}$; and
sending data related to the azimuth angle $\theta$ and the standard deviation $\sigma_\theta$ to the transmitter.

10. The method of claim 9, wherein the step of sending data related to the azimuth angle $\theta$ and the standard deviation $\sigma_\theta$ to the transmitter further includes determining most significant digits and least significant digits associated with each of the azimuth angle $\theta$ and the standard deviation $\sigma_\theta$, and then sending the least significant digits associated with each of the azimuth angle $\theta$ and the standard deviation $\sigma_\theta$ to the transmitter.

11. The method of claim 10, wherein the determining step further comprises applying predetermined pseudo-random dithering sequences to average out boundary effects between the most significant digits and the least significant digits associated with the azimuth angle $\theta$ and the standard deviation $\sigma_\theta$.

12. A receiver for feeding channel state information back to a transmitter, the receiver comprising:
a processor; and
a non-transitory memory that stores processor-executable instructions wherein the processor interfaces with the non-transitory memory and executes the processor-executable instructions to:
receive a downlink signal from the transmitter;
compute a transmit channel correlation matrix $\Phi'_{TX}$ using the received downlink signal, wherein the processor executes the processor-executable instructions to:
estimate an elevation angle $\phi$ and an azimuth angle $\theta$ from the transmitter to the receiver using the transmit channel correlation matrix $\Phi'_{TX}$; and
send data related to the elevation angle $\phi$ and the azimuth angle $\theta$ to the transmitter.

13. The receiver of claim 12, wherein the processor executes the processor-executable instructions to send data related to the elevation angle $\phi$ and the azimuth angle $\theta$ to the transmitter by determining most significant digits and least significant digits associated with each of the elevation angle $\phi$ and the azimuth angle $\theta$, and then send the least significant digits associated with each of the elevation angle $\phi$ and the azimuth angle $\theta$ to the transmitter.

14. The receiver of claim 13, wherein the processor executes the processor-executable instructions to apply predetermined pseudo-random dithering sequences to average out boundary effects between the most significant digits and the least significant digits associated with the elevation angle $\phi$ and the azimuth angle $\theta$.

15. The receiver of claim 12, wherein the processor executes the processor-executable instructions to send data related to at least the azimuth angle $\theta$ to the transmitter by determining most significant digits and least significant digits associated with the azimuth angle $\theta$ and sending the least significant digits associated with the azimuth angle $\theta$ to the transmitter.

16. The receiver of claim 12, wherein the processor executes the processor-executable instructions to apply a predetermined pseudo-random dithering sequence to average out a boundary effect between the most significant digits and the least significant digits associated with the azimuth angle $\theta$.

17. A receiver for feeding channel state information back to a transmitter, the receiver comprising:
a processor; and
a non-transitory memory that stores processor-executable instructions wherein the processor interfaces with the non-transitory memory and executes the processor-executable instructions to:
receive a downlink signal from the transmitter;
compute a transmit channel correlation matrix $\Phi'_{TX}$ using the received downlink signal;
estimate an elevation angle $\phi$ and a standard deviation $\sigma_\phi$ of an angular spread in the elevation angle $\phi$ from the transmitter to the receiver, and an azimuth angle $\theta$, and a standard deviation $\sigma_\phi$ of an angular spread in the azimuth angle θ from the transmitter to the receiver using the transmit channel correlation matrix $\Phi'_{TX}$; and send data related to the elevation angle φ, the standard deviation $\sigma_\phi$, the azimuth angle θ, and the standard deviation $\sigma_\theta$ to the transmitter.

18. The receiver of claim 17, wherein the processor executes the processor-executable instructions to send data related to the elevation angle φ, the standard deviation $\sigma_\phi$, the azimuth angle θ, and the standard deviation $\sigma_\theta$ to the transmitter by determining most significant digits and least significant digits associated with each of the elevation angle φ, the standard deviation $\sigma_\phi$, the azimuth angle θ, and the standard deviation $\sigma_\theta$, and then sending the least significant digits associated with each of the elevation angle φ, the standard deviation $\sigma_\phi$, the azimuth angle θ, and the standard deviation $\sigma_\theta$ to the transmitter.

19. The receiver of claim 18, wherein the processor executes the processor-executable instructions to apply predetermined pseudo-random dithering sequences to average out boundary effects between the most significant digits and the least significant digits associated with the elevation angle φ, the standard deviation $\sigma_\phi$, the azimuth angle θ, and the standard deviation $\sigma_\theta$.

20. A receiver for feeding channel state information back to a transmitter, the receiver comprising:
a processor; and
a non-transitory memory that stores processor-executable instructions wherein the processor interfaces with the non-transitory memory and executes the processor-executable instructions to:
receive a downlink signal from the transmitter;
compute a transmit channel correlation matrix $\Phi'_{TX}$ using the received downlink signal,
estimate an azimuth angle θ, and a standard deviation $\sigma_\theta$ of an angular spread in the azimuth angle θ from the transmitter to the receiver using the transmit channel correlation matrix $\Phi'_{TX}$; and
send data related to the azimuth angle θ and the standard deviation $\sigma_\theta$ to the transmitter.

21. The receiver of claim 20, wherein the processor executes the processor-executable instructions to send data related to the azimuth angle θ and the standard deviation $\sigma_\theta$ to the transmitter further includes determining most significant digits and least significant digits associated with each of the azimuth angle θ and the standard deviation $\sigma_\theta$, and then sending the least significant digits associated with each of the azimuth angle θ and the standard deviation $\sigma_\theta$ to the transmitter.

22. The receiver of claim 21, wherein the processor executes the processor-executable instructions to apply predetermined pseudo-random dithering sequences to average out boundary effects between the most significant digits and the least significant digits associated with the azimuth angle θ and the standard deviation $\sigma_\theta$.

23. A method implemented by a transmitter for reconstructing a transmit channel correlation matrix $\Phi_{TX}$ using at least feedback data received from a receiver, the method comprising the steps of:
converting the feedback data to at least an estimated azimuth angle θ and an estimated elevation angle φ from the transmitter to the receiver; and
computing the transmit channel correlation matrix $\Phi_{TX}$ using at least the estimated azimuth angle θ and the estimated elevation angle φ.

24. The method of claim 23, wherein the step of computing the transmit channel correlation matrix $\Phi_{TX}$ further includes combining large-scale measurements associated with at least an azimuth angle θ and an elevation angle φ measured at the transmitter with small-scale measurements associated with at least the estimated azimuth angle θ and the estimated elevation angle φ.

25. The method of claim 24, wherein the combining step further comprises applying a predetermined pseudo-random dithering sequence to average out a boundary effect between the most significant digits and the least significant digits associated with the azimuth angle θ and the elevation angle φ.

26. The method of claim 23, wherein the step of computing the transmit channel correlation matrix $\Phi_{TX}$ further includes combining large-scale measurements associated with at least an azimuth angle θ measured at the transmitter with small-scale measurements associated with at least the estimated azimuth angle θ.

27. The method of claim 23, wherein the combining step further comprises applying a predetermined pseudo-random dithering sequence to average out a boundary effect between the most significant digits and the least significant digits associated with the azimuth angle θ.

28. A method implemented by a transmitter for reconstructing a transmit channel correlation matrix $\Phi_{TX}$ using at least feedback data received from a receiver, the method comprising the steps of:
receiving feedback data related to channel state information from the receiver;
converting the feedback data to at least an estimated azimuth angle θ, an estimated elevation angle φ, an estimated standard deviation $\sigma_\phi$, and an estimated standard deviation $\sigma_\theta$ from the transmitter to the receiver; and
computing the transmit channel correlation matrix $\Phi_{TX}$ using at least the estimated azimuth angle θ, the estimated elevation angle φ, the estimated standard deviation $\sigma_\phi$, and the estimated standard deviation $\sigma_\theta$.

29. The method of claim 28, wherein the step of computing the transmit channel correlation matrix $\Phi_{TX}$ further includes combining large-scale measurements associated with at least an azimuth angle θ, an elevation angle φ, a standard deviation $\sigma_\phi$, and a standard deviation $\sigma_\theta$ measured at the transmitter with small-scale measurements associated with at least the estimated azimuth angle θ, the estimated elevation angle φ, the estimated standard deviation $\sigma_\phi$, and the estimated standard deviation $\sigma_\theta$.

30. The method of claim 29, wherein the combining step further comprises applying a predetermined pseudo-random dithering sequence to average out a boundary effect between the most significant digits and the least significant digits associated with the azimuth angle θ, the elevation angle φ, the standard deviation $\sigma_\phi$, and the standard deviation $\sigma_\theta$.

31. A method implemented by a transmitter for reconstructing a transmit channel correlation matrix $\Phi_{TX}$ using at least feedback data received from a receiver, the method comprising the steps of:
receiving feedback data related to channel state information from the receiver;
converting the feedback data to at least an estimated azimuth angle θ, and an estimated standard deviation $\sigma_\theta$ from the transmitter to the receiver; and
computing the transmit channel correlation matrix $\Phi_{TX}$ using at least the estimated azimuth angle θ, and the estimated standard deviation $\sigma_\theta$.

32. The method of claim 31, wherein the step of computing the transmit channel correlation matrix $\Phi_{TX}$ further includes combining large-scale measurements associated with at least an azimuth angle θ, and a standard deviation $\sigma_\theta$ measured at the transmitter with small-scale measurements associated with at least the estimated azimuth angle θ, and the estimated standard deviation $\sigma_\theta$.

33. The method of claim 32, wherein the combining step further comprises applying a predetermined pseudo-random dithering sequence to average out a boundary effect between the most significant digits and the least significant digits associated with the azimuth angle θ, and the standard deviation $\sigma_\theta$.

34. A transmitter for reconstructing a transmit channel correlation matrix $\Phi_{TX}$ using at least feedback data received from a receiver, the transmitter comprising:
   a transmit antenna with multiple clusters of antennas;
   a processor; and
   a non-transitory memory that stores processor-executable instructions wherein the processor interfaces with the non-transitory memory and executes the processor-executable instructions to:
   receive feedback data related to channel state information from the receiver;
   convert the feedback data to at least an estimated azimuth angle θ and an estimated elevation angle φ from the transmitter to the receiver; and
   compute the transmit channel correlation matrix $\Phi_{TX}$ using at least the estimated azimuth angle θ and the estimated elevation angle φ.

35. The transmitter of claim 34, wherein the processor executes the processor-executable instructions to compute the transmit channel correlation matrix $\Phi_{TX}$ by combining large-scale measurements associated with at least an azimuth angle θ and an elevation angle φ measured at the transmitter with small-scale measurements associated with at least the estimated azimuth angle θ and the estimated elevation angle φ.

36. The transmitter of claim 35, wherein the processor executes the processor-executable instructions to apply a predetermined pseudo-random dithering sequence to average out a boundary effect between the most significant digits and the least significant digits associated with the azimuth angle θ and the elevation angle φ.

37. The transmitter of claim 34, wherein the processor executes the processor-executable instructions to compute the transmit channel correlation matrix $\Phi_{TX}$ by combining large-scale measurements associated with at least an azimuth angle θ measured at the transmitter with small-scale measurements associated with at least the estimated azimuth angle θ.

38. The transmitter of claim 34, wherein the processor executes the processor-executable instructions to apply a predetermined pseudo-random dithering sequence to average out a boundary effect between the most significant digits and the least significant digits associated with the azimuth angle θ.

39. A transmitter for reconstructing a transmit channel correlation matrix $\Phi_{TX}$ using at least feedback data received from a receiver, the transmitter comprising:
   a transmit antenna with multiple clusters of antennas;
   a processor; and
   a non-transitory memory that stores processor-executable instructions wherein the processor interfaces with the non-transitory memory and executes the processor-executable instructions to:
   receive feedback data related to channel state information from the receiver;
   convert the feedback data to at least an estimated azimuth angle θ, an estimated elevation angle φ, an estimated standard deviation $\sigma_\phi$, and an estimated standard deviation $\sigma_\theta$ from the transmitter to the receiver; and
   compute the transmit channel correlation matrix $\Phi_{TX}$ using at least the estimated azimuth angle θ, the estimated elevation angle φ, the estimated standard deviation $\sigma_\phi$, and the estimated standard deviation $\sigma_\theta$.

40. The transmitter of claim 39, wherein the processor executes the processor-executable instructions to compute the transmit channel correlation matrix $\Phi_{TX}$ by combining large-scale measurements associated with at least an azimuth angle θ, an elevation angle φ, a standard deviation $\sigma_\phi$, and a standard deviation $\sigma_\theta$ measured at the transmitter with small-scale measurements associated with at least the estimated azimuth angle θ, the estimated elevation angle φ, the estimated standard deviation $\sigma_\phi$, and the estimated standard deviation $\sigma_\theta$.

41. The transmitter of claim 40, wherein the processor executes the processor-executable instructions to apply a predetermined pseudo-random dithering sequence to average out a boundary effect between the most significant digits and the least significant digits associated with the azimuth angle θ, the elevation angle φ, the standard deviation $\sigma_\phi$, and the standard deviation $\sigma_\theta$.

42. A transmitter for reconstructing a transmit channel correlation matrix $\Phi_{TX}$ using at least feedback data received from a receiver, the transmitter comprising:
   a transmit antenna with multiple clusters of antennas;
   a processor; and
   a non-transitory memory that stores processor-executable instructions wherein the processor interfaces with the non-transitory memory and executes the processor-executable instructions to:
   receive feedback data related to channel state information from the receiver;
   convert the feedback data to at least an estimated azimuth angle θ, and an estimated standard deviation $\sigma_\theta$ from the transmitter to the receiver; and
   compute the transmit channel correlation matrix $\Phi_{TX}$ using at least the estimated azimuth angle θ, and the estimated standard deviation $\sigma_\theta$.

43. The transmitter of claim 42, wherein the processor executes the processor-executable instructions to compute the transmit channel correlation matrix $\Phi_{TX}$ by combining large-scale measurements associated with at least an azimuth angle θ and a standard deviation $\sigma_\theta$ measured at the transmitter with small-scale measurements associated with at least the estimated azimuth angle θ and the estimated standard deviation $\sigma_\theta$.

44. The transmitter of claim 43, wherein the processor executes the processor-executable instructions to apply a predetermined pseudo-random dithering sequence to average out a boundary effect between the most significant digits and the least significant digits associated with the azimuth angle θ and the standard deviation $\sigma_\theta$.

* * * * *

UNITED STATES PATENT AND TRADEMARK OFFICE
CERTIFICATE OF CORRECTION

PATENT NO. : 8,442,449 B2
APPLICATION NO. : 12/941114
DATED : May 14, 2013
INVENTOR(S) : Hui et al.

It is certified that error appears in the above-identified patent and that said Letters Patent is hereby corrected as shown below:

In the Specifications

In Column 2, Line 10, delete "A 1" and insert -- A1 --, therefor.

In Column 2, Line 43, delete "an" and insert -- a --, therefor.

In Column 4, Line 37, delete "$\rho_\varphi$," and insert -- $\sigma_\varphi$, --, therefor.

In Column 6, Line 9, delete "a" and insert -- an --, therefor.

In Column 6, Line 18, after "wavelength" delete "is".

In Column 6, Line 22, delete "a elevation" and insert -- an elevation --, therefor.

In Column 7, Line 6, Equation (5), delete "$\cos \theta]^T$" and insert -- $\cos \varphi]^T$ --, therefor.

In Column 7, Line 43, delete "receiving," and insert -- receiving --, therefor.

In Column 7, Line 49, delete "$\varphi_{TX}$," and insert -- $\varphi_{TX}$ --, therefor.

In Column 8, Line 32, Equation (9), delete "$\underset{\theta', \phi'}{\operatorname{argmin}}\{$" and insert -- $\underset{\theta', \phi'}{\operatorname{argmax}}\{$ --, therefor.

In Column 8, Line 52, Equation (11), delete "$\left\| \frac{\Phi'_{TX}}{tr\{\Phi'_{TX}\}} - v_T^H(\theta^\%)v_T^H(\theta^\%) \right\|_F^2$" and insert -- $\left\| \frac{\Phi'_{TX}}{tr\{\Phi'_{TX}\}} - v_T(\theta^\%)v_T^H(\theta^\%) \right\|_F^2$ --, therefor.

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,442,449 B2

In Column 9, Line 28, delete "to followed" and insert -- followed --, therefor.

In Column 9, Line 47, delete "angle from" and insert -- angle θ from --, therefor.

In Column 9, Line 54, delete "bθ" and insert -- $b_\theta$ --, therefor.

In Column 9, Line 57, delete "bθ" and insert -- $b_\theta$ --, therefor.

In Column 9, Line 59, delete "bθ" and insert -- $b_\theta$ --, therefor.

In Column 10, Line 21, delete "bθ" and insert -- $b_\theta$ --, therefor.

In Column 10, Line 23, delete "bθ" and insert -- $b_\theta$ --, therefor.

In Column 10, Line 33, delete "b" and insert -- $b_\theta$ --, therefor.

In Column 11, Line 41, delete "θ$_\varphi$" and insert -- $\sigma_\theta$ --, therefor.

In Column 11, Line 55, delete "φ$_{TX}$," and insert -- $\Phi'_{TX}$ --, therefor.

In Column 11, Line 58, delete "φ$_{TX}$" and insert -- $\Phi'_{TX}$ --, therefor.

In Column 11, Line 59, delete "σφ" and insert -- $\sigma_\varphi$ --, therefor.

In Column 11, Line 64, delete "1$_o$" and insert -- $I_0$ --, therefor.

In Column 12, Line 6, delete "b$_\theta$," and insert -- $b_\varphi$, --, therefor.

In Column 12, Line 7, delete "σ$_\theta$," and insert -- $\sigma_\theta$ --, therefor.

In Column 12, Line 10, delete "Δφ$_3$" and insert -- $\Delta\varphi_m$ --, therefor.

In Column 12, Line 15, delete "T$_\varphi$(x)" and insert -- $F_\varphi(x)$ --, therefor.

In Column 12, Line 19, Equation (18), delete "$\Delta\phi_m = F_\theta^{-1}\left(\frac{m-1/2}{M}\right)$," and insert -- $$\Delta\phi_m = F_\phi^{-1}\left(\frac{m-1/2}{M}\right).$$ --, therefor.

In Column 12, Line 24, delete "σ$_\theta$," and insert -- $\sigma_\theta$ --, therefor.

In Column 12, Line 28, delete "φ$_{TX}$," and insert -- $\varphi_{TX}$ --, therefor.

In Column 12, Line 50, delete "(using" and insert -- using --, therefor.

In Column 13, Line 46, delete "σ$_\theta$," and insert -- $\sigma_\theta$ --, therefor.

CERTIFICATE OF CORRECTION (continued)
U.S. Pat. No. 8,442,449 B2

In Column 13, Line 65, delete "$2^{-(B_\phi - B_\theta\%)}$," and insert -- $2^{-(B_\phi - B_\phi\%)}$, --, therefor.

In Column 14, Line 37, delete "$\Phi_{TX}$" and insert -- $\Phi'_{TX}$ --, therefor.

In Column 14, Line 44, delete "$\varepsilon_\Phi A_\theta$" and insert -- $\varepsilon_\Phi, A_\theta$ --, therefor.

In Column 14, Line 46, delete "$\sigma_\theta$," and insert -- $\sigma_\Phi$, --, therefor.

In Column 14, Line 47, delete "standard to" and insert -- standard --, therefor.

In Column 14, Line 54, delete "$b_{\sigma_\phi}$," and insert -- $b_{\sigma_\phi}$ --, therefor.

In Column 14, Line 62, delete "$b_{\sigma_\theta}$" and insert -- $b_{\sigma_\theta}$, --, therefor.

In Column 15, Line 1, delete "to channel" and insert -- related to channel --, therefor.

In Column 15, Line 7, delete "(0" and insert -- (f) --, therefor.

In Column 15, Line 8, delete "$\sigma_\theta$," and insert -- $\sigma_\theta$ --, therefor.

In Column 15, Line 13, delete "$I_\Phi$" and insert -- $I_\Phi$, --, therefor.

In Column 15, Line 17, delete "$\varepsilon_\Phi A_\theta$" and insert -- $\varepsilon_\Phi, A_\theta$ --, therefor.

In Column 15, Line 51, delete "A 1" and insert -- A1 --, therefor.

In Column 16, Line 34, delete "A 1" and insert -- A1. --, therefor.

In Column 16, Line 41, delete "to Although" and insert -- Although --, therefor.

In the Claims:

In Column 16, Line 65, in Claim 2, delete "angle$\theta$," and insert -- angle $\theta$, --, therefor.

In Column 17, Line 24, in Claim 6, delete "deviation" and
insert -- deviation $\sigma_\Phi$ --, therefor.

In Column 17, Line 25, in Claim 6, delete "angle $\theta$" and insert -- angle $\Phi$ --, therefor.

In Column 17, Line 27, in Claim 6, delete "deviation $\sigma_\Phi$" and insert -- deviation $\sigma_\theta$ --, therefor.

In Column 17, Line 33, in Claim 6, delete "deviation $\sigma_\Phi$" and
insert -- deviation $\sigma_\theta$ --, therefor.

In Column 18, Line 2, in Claim 10, delete "angle$\theta$" and insert -- angle $\theta$ --, therefor.

In Column 18, Line 44, in Claim 15, delete "angle$\theta$" and insert -- angle $\theta$ --, therefor.

CERTIFICATE OF CORRECTION (continued)
U.S. Pat. No. 8,442,449 B2

In Column 18, Line 46, in Claim 15, delete "angleθ" and insert -- angle θ --, therefor.

In Column 18, Line 47, in Claim 15, delete "angleθ" and insert -- angle θ --, therefor.

In Column 18, Line 53, in Claim 16, delete "angleθ." and insert -- angle θ. --, therefor.

In Column 18, Line 67, in Claim 17, delete "deviation $\sigma_\Phi$" and insert -- deviation $\sigma_\theta$ --, therefor.

In Column 19, Line 32, in Claim 20, delete "matrix $\Phi'_{TX}$" and insert -- matrix $\Phi'_{TX}$ --, therefor.

In Column 19, Line 37, in Claim 20, delete "matrix $\Phi'_{TX}$;" and insert -- matrix $\Phi'_{TX}$; --, therefor.

In Column 19, Line 42, in Claim 21, delete "θand" and insert -- θ and --, therefor.

In Column 19, Line 45, in Claim 21, delete "θand" and insert -- θ and --, therefor.

In Column 19, Line 47, in Claim 21, delete "θand" and insert -- θ and --, therefor.

In Column 19, Line 56, in Claim 23, delete "matrix$\Phi_{TX}$" and insert -- matrix $\Phi_{TX}$ --, therefor.

In Column 19, Line 60, in Claim 23, delete "Φfrom" and insert -- Φ from --, therefor.

In Column 19, Line 62, in Claim 23, delete "matrix$\Phi_{TX}$" and insert -- matrix $\Phi_{TX}$ --, therefor.

In Column 19, Line 63, in Claim 23, delete "θand" and insert -- θ and --, therefor.

In Column 19, Line 66, in Claim 24, delete "matrix$\Phi_{TX}$" and insert -- matrix $\Phi_{TX}$ --, therefor.

In Column 20, Line 1, in Claim 24, delete "Φmeasured" and insert -- Φ measured --, therefor.

In Column 20, Line 11, in Claim 26, delete "matrix$\Phi_{TX}$" and insert -- matrix $\Phi_{TX}$ --, therefor.

In Column 20, Line 23, in Claim 28, delete "matrix$\Phi_{TX}$" and insert -- matrix $\Phi_{TX}$ --, therefor.

In Column 20, Line 33, in Claim 28, delete "matrix$\Phi_{TX}$" and insert -- matrix $\Phi_{TX}$ --, therefor.

In Column 20, Line 38, in Claim 29, delete "matrix$\Phi_{TX}$" and insert -- matrix $\Phi_{TX}$ --, therefor.

In Column 20, Line 53, in Claim 31, delete "matrix$\Phi_{TX}$" and insert -- matrix $\Phi_{TX}$ --, therefor.

In Column 20, Line 61, in Claim 31, delete "matrix$\Phi_{TX}$" and insert -- matrix $\Phi_{TX}$ --, therefor.

In Column 20, Line 65, in Claim 32, delete "matrix$\Phi_{TX}$" and insert -- matrix $\Phi_{TX}$ --, therefor.

CERTIFICATE OF CORRECTION (continued)

In Column 21, Line 10, in Claim 34, delete "matrix$\Phi_{TX}$" and insert -- matrix $\Phi_{TX}$ --, therefor.

In Column 21, Line 21, in Claim 34, delete "$\Phi$from" and insert -- $\Phi$ from --, therefor.

In Column 21, Line 23, in Claim 34, delete "matrix$\Phi_{TX}$" and insert -- matrix $\Phi_{TX}$ --, therefor.

In Column 21, Line 24, in Claim 24, delete "$\theta$and" and insert -- $\theta$ and --, therefor.

In Column 21, Line 28, in Claim 35, delete "matrix$\Phi_{TX}$" and insert -- matrix $\Phi_{TX}$ --, therefor.

In Column 21, Line 30, in Claim 35, delete "$\Phi$measured" and insert -- $\Phi$ measured --, therefor.

In Column 21, Line 42, in Claim 37, delete "matrix$\Phi_{TX}$" and insert -- matrix $\Phi_{TX}$ --, therefor.

In Column 21, Line 44, in Claim 37, delete "$\theta$measured" and insert -- $\theta$ measured --, therefor.

In Column 21, Line 53, in Claim 39, delete "matrix$\Phi_{TX}$" and insert -- matrix $\Phi_{TX}$ --, therefor.

In Column 22, Line 7, in Claim 39, delete "matrix$\Phi_{TX}$" and insert -- matrix $\Phi_{TX}$ --, therefor.

In Column 22, Line 13, in Claim 40, delete "matrix$\Phi_{TX}$" and insert -- matrix $\Phi_{TX}$ --, therefor.

In Column 22, Line 30, in Claim 42, delete "matrix$\Phi_{TX}$" and insert -- matrix $\Phi_{TX}$ --, therefor.

In Column 22, Line 39, in Claim 42, delete "receiver:" and insert -- receiver; --, therefor.

In Column 22, Line 43, in Claim 42, delete "matrix$\Phi_{TX}$" and insert -- matrix $\Phi_{TX}$ --, therefor.

In Column 22, Line 48, in Claim 43, delete "matrix$\Phi_{TX}$" and insert -- matrix $\Phi_{TX}$ --, therefor.

In Column 22, Line 52, in Claim 43, delete "angle$\theta$" and insert -- angle $\theta$ --, therefor.

In Column 22, Line 58, in Claim 44, delete "angle$\theta$" and insert -- angle $\theta$ --, therefor.